US009135123B1

(12) United States Patent
Armangau et al.

(10) Patent No.: US 9,135,123 B1
(45) Date of Patent: Sep. 15, 2015

(54) MANAGING GLOBAL DATA CACHES FOR FILE SYSTEM

(75) Inventors: Philippe Armangau, Acton, MA (US); Jean-Pierre Bono, Westborough, MA (US); Sitaram Pawar, Shrewsbury, MA (US); Christopher Seibel, Walpole, MA (US); Yubing Wang, Holden, MA (US)

(73) Assignee: EMC Corporation, Hopkinton, MA (US)

( * ) Notice: Subject to any disclaimer, the term of this patent is extended or adjusted under 35 U.S.C. 154(b) by 428 days.

(21) Appl. No.: 13/339,309

(22) Filed: Dec. 28, 2011

(51) Int. Cl.
*G06F 13/14* (2006.01)
*G06F 11/14* (2006.01)
*G06F 17/30* (2006.01)

(52) U.S. Cl.
CPC ...... *G06F 11/1471* (2013.01); *G06F 17/30185* (2013.01)

(58) Field of Classification Search
CPC ............ G06F 12/0866; G06F 11/2089; G06F 11/2005; G06F 3/0658; G06F 8/4442; G06F 12/084; G06F 12/0871; G06F 12/0882; G06F 12/0897; G06F 11/1471; G06F 11/1474; G06F 17/30185
See application file for complete search history.

(56) References Cited

U.S. PATENT DOCUMENTS

| 5,918,229 | A  | * | 6/1999  | Davis et al. ................. 705/27.1 |
| 6,732,124 | B1 | * | 5/2004  | Koseki et al. |
| 2006/0143383 | A1 | * | 6/2006 | Zohar et al. .................. 711/118 |
| 2007/0260842 | A1 | * | 11/2007 | Faibish et al. ................. 711/170 |
| 2008/0288561 | A1 | * | 11/2008 | Croisettier et al. ........... 707/205 |

* cited by examiner

*Primary Examiner* — Cheng-Yuan Tseng
*Assistant Examiner* — Candice Rankin
(74) *Attorney, Agent, or Firm* — Krishnendu Gupta; Deepika Bhayana

(57) ABSTRACT

A method is used in managing global data caches for file systems. Space is allocated in a volatile memory of a data storage system to a global data cache that is configured to store a set of data objects for a plurality of different file systems. The set of data objects is accessed by the plurality of different file systems. Contents of a file of a file system are stored in a data object in the global data cache upon receiving a write I/O request for the file. A copy of the data object and information for the data object are stored in a persistent journal that is stored in a non-volatile memory of the data storage system. Contents of the file are updated on a storage device based on the data object stored in the global data cache and information stored in the persistent journal.

20 Claims, 18 Drawing Sheets

MANAGING GLOBAL DATA CACHES FOR FILE SYSTEM

BACKGROUND

1. Technical Field

This application relates to managing global data caches for file systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

An operating system, executing on a data storage system such as a file server, controls the allocation of a memory of the data storage system to host systems or clients connected to the data storage system. Allocation is generally performed at a page granularity, where a page is a selected number of contiguous blocks. The particular size of a page is typically a function of an operating system, the page size may be 8 kilobytes (KB).

To the operating system of a data storage system, a file system is a collection of file system blocks of a specific size. For example, the size of a file system block may be 8 kilobytes (KB). As the data storage system is initialized, some of the pages are reserved for use by the operating system, some pages are designated as 'free' for allocation to other applications, and a large chunk of pages are reserved to provide a buffer cache (also referred to as "buffer cache pool"). The buffer cache temporarily stores pages in a volatile memory of a data storage system that are also stored in an attached disk device to increase application performance.

File systems typically include metadata describing attributes of a file system and data from a user of the file system. A file system contains a range of file system blocks that store metadata and data. A user of a filesystem access the filesystem using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in an hierarchy depending upon the size of a file where each level of indirect blocks includes pointers to indirect blocks at the next lower level.

A write I/O request directed to a file using a "file sync" option (also referred to as "stable write") requires that a write operation directed to the file writes both data and metadata immediately to a disk rather than incurring a delay. However data and metadata may still be written into a cache. On the other hand, a write I/O request using a "data sync" option requires that data is written immediately to a disk but metadata may be cached and flushed to the disk at a later time.

The accuracy and consistency of a file system is necessary to relate applications and data used by those applications. In a data storage system, hundreds of files may be created, modified, and deleted on a regular basis. Each time a file is modified, the data storage system performs a series of file system updates. These updates, when written to a disk storage reliably, yield a consistent file system.

Although existing various methods provide reasonable means of writing data to a persistent storage and providing access to the data of file systems, with the explosion in the amount of data being generated, the number of resources required for managing data updates associated with write I/Os to file systems are rising dramatically thereby causing increase in a write latency and decreases in I/O performance of each write I/O request.

SUMMARY OF THE INVENTION

A method is used in managing global data caches for file systems. Space is allocated in a volatile memory of a data storage system to a global data cache that is configured to store a set of data objects for a plurality of different file systems. A data object of the set of data objects is accessed by the plurality of different file systems. Contents of a file of a file system are stored in a data object of the set of data objects of the global data cache upon receiving a write I/O request for the file of the file system. A copy of the data object and information for the data object are stored in a persistent journal associated with the file system. The persistent journal is stored in a non-volatile memory of the data storage system. Contents of the file are updated on a storage device based on the data object stored in the global data cache and information stored in the persistent journal. The contents of the file are updated on the storage device after providing acknowledgement of completion of the write I/O request.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
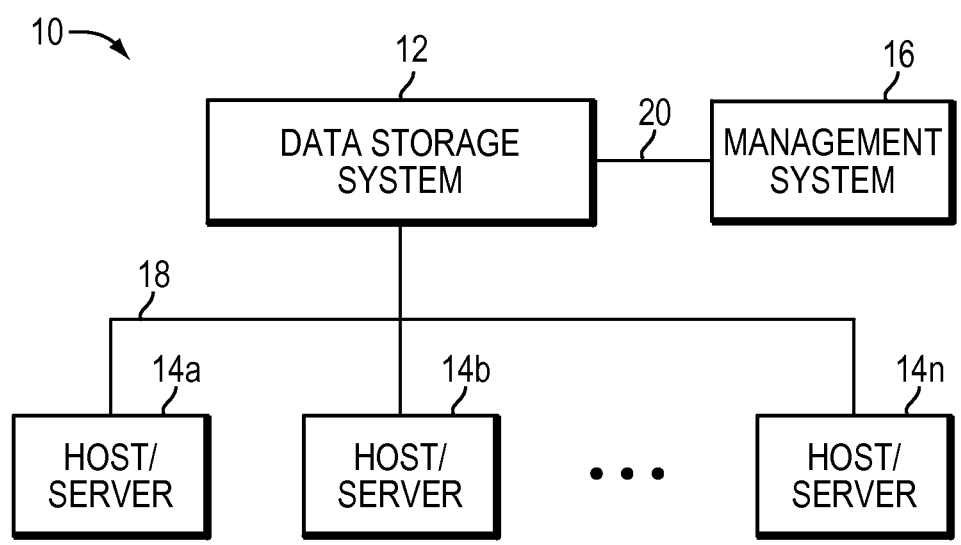
FIGS. 1-3 are examples of an embodiment of a computer system that may utilize the techniques described herein.

Described below is a technique for use in managing global data caches for file systems, which technique may be used to provide, among other things, allocating space in a volatile memory of a data storage system to a global data cache, configured to store a set of data objects for a plurality of different file systems, where a data object of the set of data objects is accessed by the plurality of different file systems, storing contents of a file of a file system in a data object of the set of data objects of the global data cache upon receiving a write I/O request for the file of the file system, where a copy of the data object and information for the data object are stored in a persistent journal associated with the file system, where the persistent journal is stored in a non-volatile memory of the data storage system, and updating contents of the file on a storage device based on the data object stored in the global data cache and information stored in the persistent journal, where the contents of the file are updated on the storage device after providing acknowledgement of completion of the write I/O request.

Generally, an I/O operation (e.g., read request, write request) directed to a file may either be a cached I/O or an uncached I/O. Typically, in case of a cached I/O operation, data associated with the cached I/O is cached in a volatile memory (e.g., a buffer cache pool) of a data storage system. In such a case, a write I/O request is executed by writing the data to a buffer of a buffer cache pool and writing the contents of the buffer to a persistent storage either before returning a successful acknowledgement to a client or at a later time based on whether the write I/O request is a stable write request or an unstable write request. Further, in such a case, a read I/O request is executed by reading data from a persistent storage into a buffer of the buffer cache pool if the data is not already cached and completing the read I/O request by reading the data from the buffer. Further, an uncached write I/O operation may be a sector aligned write operation indicating that a file offset at which the write operation is performed aligns with an address at which a sector of a disk starts (such as multiple of 512 bytes), and the amount of data to be written as part of the uncached write I/O operation aligns with a size of the sector of the disk. Generally, an uncached interface can be turned on or off per file system as a mount-time option.

Conventionally, when a file system is mounted with an option indicating an uncached I/O, a read I/O request is performed in a similar way a read I/O request of a cached I/O operation is performed. However, in such a conventional case, a write I/O request (also referred to as "uncached write I/O") to a file system writes data directly to a persistent storage (e.g., disk) on which the file system is stored. Further, in such a conventional system, an uncached write I/O request does not update any in-memory data structures of a file system.

Further, typically a write I/O operation may be a stable write or an unstable write. In case of an unstable write I/O operation, a data storage system does not commit data associated with the unstable write I/O operation to a persistent storage before acknowledging completion of the write I/O request to a client but writes data to an in-memory buffer in a volatile memory cache and flushes the data to the persistent storage at a later time.

On the other hand, in case of a stable write I/O operation, conventionally, a data storage system must commit data to a persistent storage before acknowledging completion of the write I/O request to a client. Thus, in such a conventional system, a synchronous write I/O operation (also referred to as "stable write") does not return an acknowledgement to a client until the data has been written down to the file system, and metadata updates has been committed to a persistent storage.

Generally, write I/O operations on large file systems often includes modification of existing contents of files of such large file systems, and/or writing data to a portion of a storage that is pre-allocated for such large file systems. Further, in such a case, applications that access such large file systems uses the "data sync" option to update on-disk contents of files of such large file systems. Conventionally, a write I/O operation using the "data sync" option writes changes to contents (or data) of a file of a file system to a persistent storage (e.g., disk) directly as part of the write I/O operation. Thus, in such a conventional system, in case of a stable write I/O operation, a data storage system must commit data to a persistent storage before acknowledging completion of the write I/O request to a client. As a result, in such a case, if using a conventional technique, changes to data of a file are committed to the file stored on a storage device as part of each write I/O operation performed on the file. Therefore, using the conventional technique in such a case may cause a high write latency and a low I/O performance each time a write I/O operation is performed on a file system. A write latency indicates the amount of time it takes to complete a write I/O request. Further, in such a conventional system, it is difficult or impossible for a data storage system to aggregate multiple changes to data of a file resulting from different write I/O requests as part of a single update operation. Further, in such a conventional system, a write latency for a write I/O operation directed to a file system may vary significantly based on the type of the write I/O operation (e.g., stable, unstable) and the type of a file system access protocol (also referred to herein as "data access protocol") used for the write I/O request. Further, in such a conventional system, if a data block of a file is deduplicated indicating that one or more files shares the data block, a data storage system may create multiple copies of the data block in a memory (e.g., buffer cache pool) of the data storage system as a result of different I/O operations performed on the shared data block such that each file sharing the data block creates a copy of the data block in the memory of the data storage system.

By contrast, in at least some implementations in accordance with the current technique as described herein, a data transaction log and a global data cache are used to improve I/O performance and decrease write latency by caching changes to data of a file in the global data cache and logging the changes in the data transaction log, flushing (also referred to herein as "committing") the changes to a storage device at a later time, and recovering the file, if required, by using information stored in the data transaction log.

Thus, in at least some implementations in accordance with the current technique as described herein, creating a global data cache for storing data objects (e.g., data blocks) of one or more files enables a data storage system to store a single instance of a data object in a memory of the data storage system if the data object is shared across the one or more files. Further, in at least some implementations in accordance with the current technique as described herein, using the global data cache for storing data of file systems of a data storage system enables the data storage system to efficiently balance utilization and tuning of the global data cache. Additionally, in at least some implementations in accordance with the current technique as described herein, the size of the global data cache may be configured based on the amount of available memory of the data storage system.

Further, in at least one embodiment of the current technique, storing changes to data of a file of a file system in a a data transaction log of a data storage system instead of modifying on-disk contents of the file system as part of a write operation enables the data storage system to reduce the number of transaction to a storage disk thereby reduces a write latency for a client of the data storage system, and increasing I/O performance for the client. In at least one embodiment of the current technique, a data transaction log for a file system is created in a non-volatile memory of a data storage system such that the data transaction log resides with in the address space of the file system thereby allowing an efficient recovery of the file system.

Further, in at least one embodiment of the current technique, managing a global data cache improves performance of an uncached write I/O operation (e.g., stable write) such that the uncached I/O operation performs in a similar amount of time that is required for an cached I/O operation to perform. Thus, in at least one embodiment of the current technique, a data storage system provides a consistent write I/O throughput for a write I/O operation directed to a file system irrespective of the type of the write I/O operation (e.g., stable, unstable) and the type of a file system access protocol used for the write operation. Further, in at least one embodiment of the current technique, flushing data to on-disk contents of a file system stored on a persistent storage is delayed until a specific criteria (e.g., threshold) is met. Thus, in at least one embodiment of the current technique, a write latency indicating the amount of time it takes to write data is reduced by delaying writing data to a persistent storage at a later time. Further, committing data to a file system may be performed by one or more background process (e.g. threads). Further, in at least one embodiment of the current technique, a background process uses buffers cache blocks cached in the global data cache and information of the data transaction log for committing data of the buffer cache blocks to a file system thereby reducing latency of write I/O operations because the data is committed to the storage device after providing acknowledgement of completion of a write I/O request to a client. Further, in at least one embodiment of the current technique, a background process that flushes data to a file on a storage device may aggregate two or more data blocks associated with different write I/O requests thereby improving I/O performance of the file by writing data blocks to the storage device such that the data blocks are efficiently located on the storage device.

In at least some implementations in accordance with the technique as described herein, the use of the managing global data caches in data storage systems technique can provide one or more of the following advantages: lowering a storage cost by reducing the number of identical copies of a data object cached in a memory of a data storage system, reducing the I/O load on a data storage system by efficiently performing write I/O operations directed to file systems, improving the I/O performance by enabling a data storage system to efficiently perform a I/O operations (e.g., read, write), and decreasing the write latency for a write I/O operation directed to a file system by storing changes to the file system in a global data cache and logging changes to a data transaction log associated with the file system.

Referring now to FIG. 1, shown is an example of an embodiment of a computer system such as a data storage system that may be used in connection with performing the technique or techniques described herein. A data storage system may be a block based storage system 12 as described herein in FIG. 1. Further, a data storage system may be a file based data storage system as described herein below in FIG. 2. Further, a data storage system may include a block based data storage system component and a file based data storage system component.

While the block based storage system 12 may be configured in a variety of ways, in at least one embodiment, the block based storage system 12 is configured as a storage area network (SAN), such as a CLARiiON™ system, as produced by EMC Corporation of Hopkinton, Mass. While a file based storage system may be configured in a variety of ways, in at least one embodiment, the file based storage system is configured as a network attached storage (NAS) system, such as a Celerra™ system produced by EMC Corporation of Hopkinton, Mass.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the block based data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the block based data storage systems over an iSCSI or fibre channel connection and the management system may communicate with the block based data storage systems over a separate network connection using TCP/IP. It should be noted that although FIG. 1 illustrates communications between the hosts and block based data storage systems being over a first connection, and communications between the management system and the block based data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the block based data storage systems 12 to perform a data operation. For example, an application executing on one of the host computers 14a-14n may perform a read or write operation resulting in one or more data requests to the block based data storage systems 12.

The management system 16 may be used in connection with management of the block based data storage systems 12. The management system 16 may include hardware and/or software components. The management system 16 may include one or more computer processors connected to one or more I/O devices such as, for example, a display or other output device, and an input device such as, for example, a keyboard, mouse, and the like. A block based data storage system manager may, for example, view information about a current storage volume configuration on a display device of the management system 16. The manager may also configure a block based data storage system 12, for example, by using a management software to define a logical grouping of logically defined devices, referred to elsewhere herein as a storage group (SG), and restrict access to the logical group.

An embodiment of the block based data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). It should be noted that each of the data storage systems may operate stand-alone, or may also included as part of a storage area network (SAN) that includes, for example, other components such as other data storage systems, file based data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the block based data storage system 12 may also include other components than as described for purposes of illustrating the techniques herein.

Figure 2:
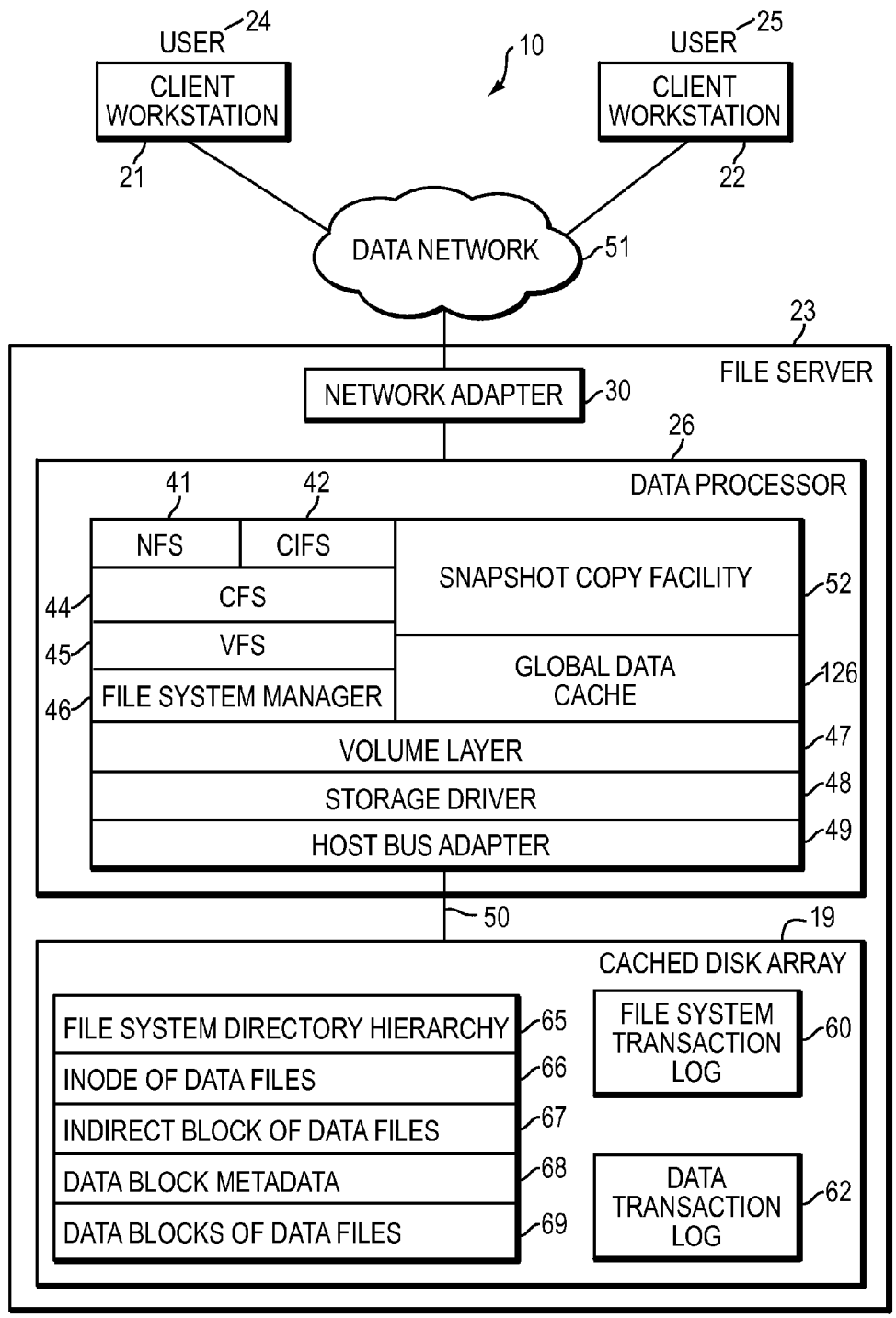

Referring now to FIG. 2, shown is an example of an embodiment of a file based data storage system that may be used in connection with performing the technique or techniques described herein. The file based data storage system 10 includes a data network 51 interconnecting clients 21, 22 and a data storage system such as a network file server 23 (also referred to simply as "file server"). The data network 51 may include any one or more of network connection technologies, such as Ethernet, and communication protocols, such as TCP/IP. The clients 21, 22, for example, are workstations such as personal computers. The workstations are operated by users 24, 25. The user 25 is a system administrator having sufficient privileges for configuring the network file server 23 and for receiving status and error messages from the network file server. Clients 21, 22 may access the network file server 23, for example, in performing input/output (I/O) operations, data requests, and other operations.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 19. The data processor 26, for example, is a commodity computer. The cached disk array 19 includes multiple disk drives, a high-speed random-access cache memory, and a logical-to-physical mapping between the cache memory and the disk drives.

The data processor 26 has a network interface 30 for communication of data packets over the data network 51 via a data transmission protocol such as TCP/IP. The data processor 26 is programmed with a Network File System (NFS) module 41 for supporting communication with network clients over the data network 51 using the NFS file access protocol, and a Common Internet File System (CIFS) module 42 for supporting communication with network clients over the data network using the CIFS file access protocol. The NFS module 41, and the CIFS module 42 are layered over a Common File System (CFS) module 44, and the CFS module is layered over a Virtual File System (VFS) module 45. The VFS module 45 is layered over a Universal File System (UxFS) module. The UxFS module is a file system manager 46 for managing a file system such as a UNIX-based file system. The CFS module 44 provides higher-level functions common to NFS 41 and CIFS 42.

The file system manager 46 accesses data organized into logical volumes defined by a logical volume layer module 47. Each logical volume maps to contiguous logical storage addresses in the cached disk array 19. The logical volume layer module 47 is layered over a storage driver 48 such as a Fibre-Channel (FC), a Small Computer System Interface (SCSI), and an Internet SCSI (iSCSI) driver. The data processor 26 sends storage access requests through a host bus adapter 49 using a storage protocol such as the FC, SCSI, or iSCSI used by the storage driver 48, depending on the physical data link 50 between the data processor 26 and the cached disk array 19.

Referring again to FIG. 2, the CFS module 44, the VFS module 45, the file system manager 46, the logical volume layer 47, and the storage driver 48 are modules of an operating system program executing on file server 23. The NFS module 41, and CIFS module 42 are internal application programs supported by the operating system. The data processor 26 is programmed with additional internal application programs including a snapshot copy facility 52.

The snapshot copy facility 52 performs a copy-on-first-write to each block in a production volume, in order to save an old version ("before image") of the changed block in a snapshot volume. Details regarding such a snapshot copy facility 52 are found in the following patent publications: Armangau et al., "Instantaneous restoration of a production copy from a snapshot copy in a data storage system," U.S. Pat. No. 6,957,362 issued Oct. 18, 2005; Raman et al., "Replication of Remote Copy Data for Internet Protocol (IP) Transmission," U.S. Patent Application Publication No. US 2003/0217119 A1, published Nov. 20, 2003; Armangau et al., "Replication of a Snapshot Using a File System Copy Differential," U.S. Patent Application Publication No. US 2004/0267836 published Dec. 30, 2004; Armangau et al., "Data Recovery with Internet Protocol Replication With or Without Full Resync," U.S. Patent Application Publication No. US 2005/0015663 A1, published Jan. 20, 2005; and John Hayden et al., "Internet Protocol Based Disaster Recovery of a Server," U.S. Published Patent Application No. 2005-0193245 published Sep. 1, 2005; all of which are incorporated herein by reference.

The data network 51 may be any one or more of a variety of networks or other type of communication connections as known to those skilled in the art. For example, the data network 51 may be the Internet, an intranet, network or other wireless or other hardwired connection(s) by which the clients 21, 22 may access and communicate with the network file server 23, and may also communicate with other components (not shown) that may be included in the network file server 23. Each of clients 21, 22 and the network file server 23 may be connected to the data network 51 by any one of a variety of connections as may be provided and supported in accordance with the type of data network 51.

The processors included in the clients 21, 22 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 23 are described herein in more detail, and may vary with each particular embodiment. Each of the clients 21, 22 and the network file server 23 may all be located at the same physical site, or, alternatively, may also be located in different physical locations. Some or all of the connections by which the clients 21-22 and the network file server 23 may be connected may pass through other communication devices, such as a Connectrix or other switching equipment that may exist such as a phone line, a repeater, a multiplexer or even a satellite.

Each of the clients 21, 22 may perform different types of data operations in accordance with different types of tasks. In the embodiment of FIG. 2, any one of the clients 21, 22 may issue a data request to the network file server 23 to perform a data operation. For example, an application executing on one of the clients 21, 22 may perform a read or write operation resulting in one or more data requests to the network file server 23.

An embodiment of the data storage system 10 may include one or more network file servers. Each of the network file server may include one or more data storage devices, such as disks. Each of the network file server included in data storage system 10 may be inter-connected (not shown). Additionally, the network file servers may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 23.

It should be noted that each of the network file server may operate stand-alone, or may also included as part of a storage area network (SAN) that includes, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 22, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single storage system may be accessed by multiple clients allowing the clients to share the data residing therein. A LUN (logical unit number) may be used to refer to one of the foregoing logically defined devices or volumes.

In such an embodiment in which element 10 of FIG. 2 is implemented using one or more data storage systems, each of the data storage systems may include code thereon for performing the techniques as described herein. In following paragraphs, reference may be made to a particular embodiment such as, for example, an embodiment in which element 10 of FIG. 2 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 23 may also include other components than as described for purposes of illustrating the techniques herein.

As shown in the data storage system 10 in FIG. 2, a file system stored on a storage device is organized as a hierarchy. At the top of the hierarchy is a hierarchy of the directories 65 in the file system. Inodes of data files 66 depend from the file system directory hierarchy 65. Indirect blocks of data files 67 depend from the inodes of the data files 66. Data block metadata 68 and data blocks of data files 69 depend from the inodes of data files 66 and from the indirect blocks of data files 67. Specific examples of this hierarchy are further described below with reference to FIGS. 3 and 4. File systems typically include metadata describing attributes of a file system and data from a user of the file system. A file system contains a range of file system blocks that store metadata and data. In at least some embodiments of the current technique, the file system block may be 8 kilobytes (KB) in size. Further, a user of data storage system 10 creates files in a file system.

The data storage system 10 also includes journal such as a file system transaction log 60. In at least one embodiment of the current technique, a journal may include a persistent log or a persistent file that may be used to update metadata of a file system stored on a persistent storage. Generally, any change in metadata of a file system may first be written to file system transaction log 60. Metadata information stored in the file system transaction log 60 is later used to recover the file system when file server 23 reboots due to a failure. Upon reboot of file server 23, file system transaction log 60 is inspected to find a last valid transaction recorded in the log 60, and the last valid transaction is applied to the file system stored on a persistent storage for updating metadata of the file system by using metadata information stored in file system transaction log 60. In at least one embodiment of the current technique, global data cache 126 stores data of a file of a file system in a volatile memory of data storage system 10.

In at least one embodiment of the current technique, global data cache 126 is initialized at the time file server 23 is initialized. The global data cache 126 is created in a volatile (e.g., Direct Random Access Memory (DRAM) of file server 23. Further a data transaction log 62 is created for each file system when storage for the file system is provisioned. The data transaction log is created in a nonvolatile memory of file server 23. Further, in at least one embodiment of the current technique, a nonvolatile memory may include a flash memory (e.g. solid state drives, EEPROM (electrically erasable programmable read-only memory)).

Figure 3:
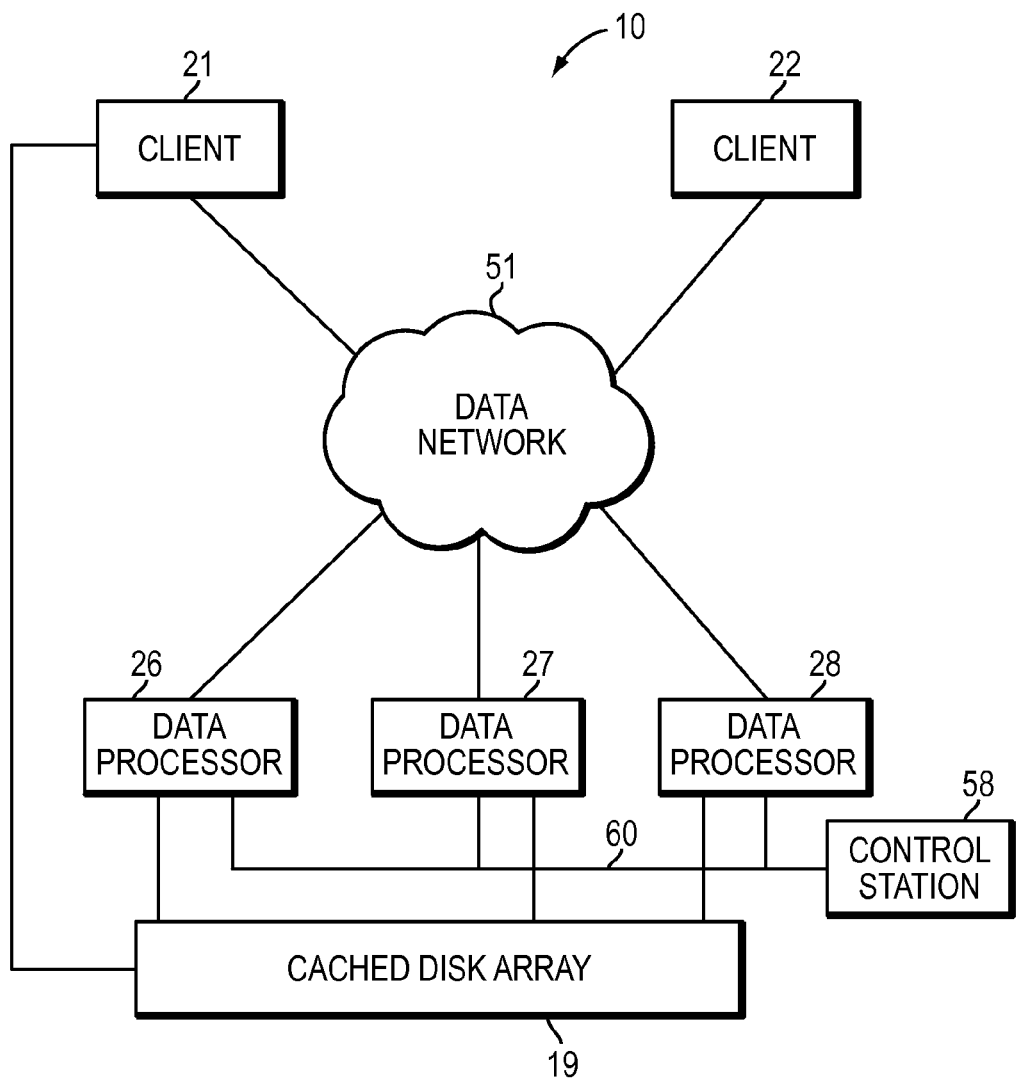

Referring now to FIG. 3, shown is the network file server 23 of FIG. 2 that may further include a control station 58 and additional data processors (such as data processors 27, 28) sharing the cached disk array 19. A dual-redundant data link 60 interconnects the data processors 26, 27, 28 to the control station 58. The control station 58 monitors a heartbeat signal from each of the data processors 26, 27, 28 in order to detect a data processor failure. If a failed data processor cannot be successfully re-booted, the control station 58 will "fence off" the failed data processor and re-assign or fail-over the data processing responsibilities of the failed data processor to another data processor in the network file server 23. The control station 58 also provides a user interface between the system administrator 25 and the network file server 23.

Figure 4:
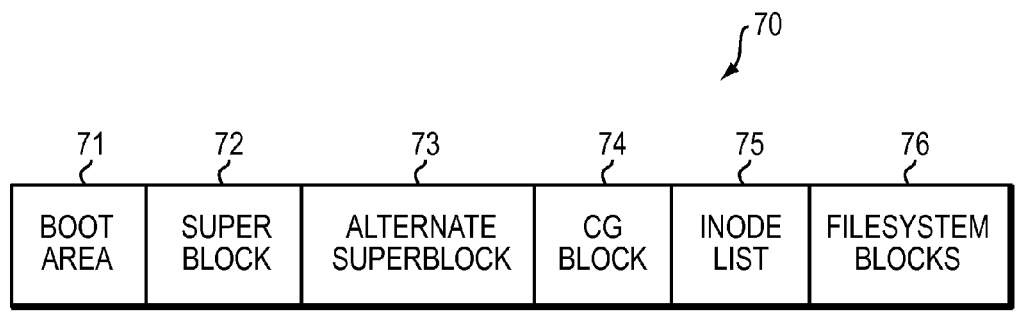
FIGS. 4-18 are diagrams illustrating in more detail components that may be used in connection with techniques herein.

Referring to FIG. 4, shown is a representation of an on-disk layout of a file system that may be included in an embodiment using the current techniques described herein. A file system 70 includes a boot area 71, a superblock 72, an alternate superblock 73, Cylinder Group (CG) block 74, an inode list 75, and file system blocks 76. The boot area 71 may contain code for booting an operating system of file server 23. The superblock 72 and alternate super block 73 contains attributes and metadata of the file system. Cylinder Group block 74 contains metadata information pertaining to cylinder groups of the file system. Inode list 75 includes the list of all inodes of each file that is present in the file system.

A file system 70 includes one or more file system blocks 76. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. However, it should be noted that a file system may be organized based on any one of the known mapping techniques such as an extent based binary tree mapping mechanism.

A file is uniquely identified by a file system identification number in file server 23. Each data block of a file is referenced by a logical block number and/or file system block number. A logical block number of a file refers to a data block by relative position of the data block inside the file. A file system block number of a file refers to a data block by relative position of the data block on a physical disk device on which the file is stored. A file system block number for a data block is computed based on a file offset and the size of the data block. Further, an inode of a file includes metadata that provides a mapping to convert a file system block number of a data block to its corresponding logical block number. For example, in case of a data block size of 4 kilobytes (KB), if a file offset value is smaller than 4096 bytes, the file offset corresponds to the first data block of the file, which has file block number 0. Further, for example, if a file offset value is equal to or greater than 4096 bytes and less than 8192 bytes, the file offset corresponds to the second data block of the file, which has file block number 1.

Generally, metadata changes of a file system resulting from an I/O request may directly be written to the file system stored on a disk, or recorded in a file system transaction log associated with the file system. A file system transaction log is used to improve performance, reliability, and recovery times of file systems. A file system transaction log for a file system offers increased reliability, because the file system transaction log may replicate some or all of the file system metadata which can be applied to the file system at a later time in order to make the file system metadata consistent with changes applied to data of the file system.

Typically, a file system transaction log only stores changes to metadata (such as inodes, directories, allocation maps) of a file system. If file server 23 shuts down without a failure, the file system transaction log can be discarded, because the file system stored on a persistent storage in such a case is consistent and includes all metadata changes stored in the file system transaction log. However, when file server 23 shuts down due to a failure, the file system transaction log is used to rebuild the file system in order to restore the file system to a consistent state. Generally, all write operations resulting in changes to metadata of a file system are first stored in the file system transaction log and corresponding metadata structures stored on a persistent storage are updated at a later time when metadata changes stored in a cache are written (or flushed) to the persistent storage. Thus, metadata structures stored on the persistent storage may contain stale data that is not consistent with metadata changes stored in the file system transaction log. Therefore, in such a case, the metadata changes stored in the file system transaction log are applied to the metadata structures stored on the persistent disk to recover the file system to a consistent state. The process of recovering a file system to a consistent state by applying metadata changes stored in a file system transaction log to a persistent storage is known as "replay of a file system transaction log".

Figure 5:
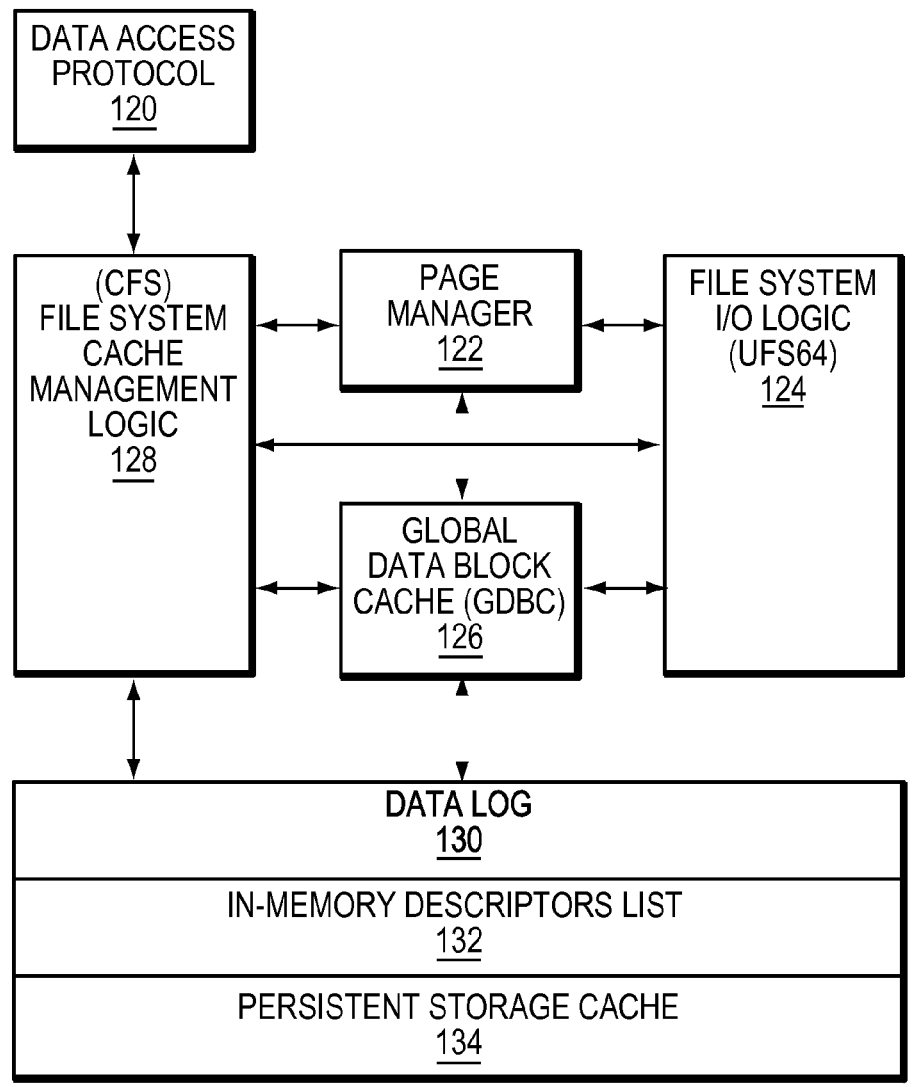

Referring to FIG. 5, shown is a detailed representation of components that may be included in an embodiment using the techniques described herein. In at least one embodiment of the current technique, a client access a file system using any one of data access protocols 120 (such as CIFS 42, NFS 41, and iSCSI 51) by issuing an I/O request (e.g., read, write) to the file system. With reference also to FIGS. 1-4, file system I/O logic 124 (also referred to herein as "UFS64") provides functionality for creating and hosting a file system in a data storage system. Further, file system I/O logic 124 provides a set of interfaces for accessing and managing files of a file system, and maintaining consistent mapping for the files of the file system. File system cache management logic 128 (also referred to herein as "Common File System" or "CFS") provides a functionality and a set of interfaces for accessing and managing files of a file system. CFS 128 includes mapping information that maps an offset of a file to a global data block cache descriptor associated with a data block that is cached in the global data block cache 126. Further, CFS 128 manages sharing of a data lock that is cached in a global data block cache 126 by using a delegated reference counting mechanism. The delegated reference counting mechanism is described in U.S. Pat. No. 8,032,498 for "Delegated reference count base file versioning" issued Oct. 4, 2011, which is incorporated herein by reference.

In at least one embodiment of the current technique, file server 23 includes a volatile memory module that can be viewed as an array of pages as the volatile memory is apportioned into fixed size frames, or pages, for organizational purposes. The terms 'frame' and 'page' will be used interchangeably herein. For example, in at least one embodiment of the current technique, the volatile memory may be apportioned into pages of 8 kilobytes (KB). Alternatively, in another embodiment of the current technique, the volatile memory may be apportioned into pages of 4 kilobytes (KB). Further, in another embodiment of the current technique, the volatile memory may be apportioned into pages of 4 megabytes (MB).

A first portion of the pages of the volatile memory module are allocated to data structures that are used to support an operating system of the file server 23. A second portion of the pages of the volatile memory module are allocated to a buffer cache pool, where the buffer cache pool includes a collection of buffer cache blocks such that each buffer cache block may correspond to a page of the volatile memory.

The remaining pages of the volatile memory module are so-called 'free' pages available for allocation to applications. The file server 23 communicates with clients coupled to the file server via network interface 30. Clients execute applications which access file systems stored on storage devices via the file server 23. A storage device on which a file system is stored is apportioned into fixed size file system blocks, for organizational purposes.

A file system contains a range of file system blocks that store metadata and data. File system blocks are allocated from a storage device for creating files and storing metadata of a file system. In at least some embodiments of the current technique, the file system block may be 8 kilobyte (KB) in size. Thus, in at least one embodiment of the current technique, there may exist 1-1 correspondence between a file system block and a page. However, it should be noted that there may not be a 1-1 correspondence between a file system block and a page.

Thus, the buffer cache pool of a data storage system is created by apportioning a portion of a volatile memory module of the data storage system into buffer cache blocks (also referred to as "buffer cache page") in such a way that each buffer cache block is represented by a buffer cache descriptor. The buffer cache pool is created when file server 23 is initialized during a boot sequence. Further, during initialization of file server 23, a buffer cache descriptor table is created for managing buffer cache blocks of the buffer cache pool. The buffer cache descriptor table includes a buffer cache descriptor entry for each buffer cache block created for the buffer cache pool. A buffer cache descriptor entry associated with a buffer cache block includes information about the buffer cache block. The information may include the physical address of the buffer cache block, as well as an identifier of a buffer cache queue to which the buffer cache block is allocated.

The buffer cache pool provides buffer cache blocks to applications for storing data and/or metadata of a file system. The buffer cache pool manages allocation, caching and deallocation of buffer cache blocks by adding the buffer cache blocks to any one of queues (or lists) managed by the buffer cache pool.

Generally, a mechanism of lists and "hints" is used to manage buffer cache blocks of the buffer cache pool. In a data storage system using the mechanism of lists and hints, a buffer cache block is allocated to store data and/or metadata of a file system so that the file system may access the buffer cache pool to retrieve the data and/or metadata when performing I/O operations on the file system. In such a system, when a buffer cache block that is allocated for storing data and/or metadata is released, the buffer cache block is labeled with a revision number. Further, the buffer cache block is added to a list (or queue) in a least recently used manner. The process of labeling a buffer cache block with a revision number before releasing the buffer cache block is known as creating a "hint"

for the buffer cache block. Creating a hint for a buffer cache block enables an application to access information stored in the buffer cache block even after the buffer cache block has been released as long as the buffer cache block has not been reused. Additionally, buffer cache blocks released to the list may be reused to store data and/or metadata of a file system when the buffer cache pool does not have free buffer cache blocks available for allocation. The process of reusing released buffer cache blocks is also known as "recycling", which is performed by removing a buffer cache block from the list in the least recently used manner such that the removed buffer cache block represents the first buffer cache block that has been released to the list compared to other buffer cache blocks existing on the list. Thus, a buffer cache block removed from the list in the least recently used manner represents the oldest buffer cache block on the list that has been referenced by an application. Consequently, the oldest buffer cache block is least likely to be referenced by the application again at a later time. When a buffer cache block is reused from the list in the least recently used manner, the revision number of the buffer cache block is updated to indicate that the hint of the buffer cache block is no longer valid. Thus, in such a case, contents of the buffer cache block may no longer be retrieved by simply accessing the buffer cache block.

Generally, if an application performing I/O operations on a file system requires access to metadata and/or data of the file system stored in a buffer cache block that has been released to a list in the least recently used manner, the application may retrieve the released buffer cache block by using the revision number ("hint") of the buffer cache block. If the buffer cache block has not been recycled (i.e., the hint is deemed valid), the buffer cache block is removed from the least recently used list and provided to the application. However, if the buffer cache block has been recycled, the buffer cache block may not be retrieved at all as the revision of the buffer cache block indicates that the hint created for the buffer cache block is no longer valid, which in turn means that contents (data and/or metadata) of the buffer cache block may have changed. Thus, the application may access data and/or metadata stored in a buffer cache block if a valid hint exists for the buffer cache block at the time the buffer cache block is accessed.

Further, a buffer cache descriptor is accessed to determine if the buffer cache block associated with the buffer cache descriptor is in fact available for allocation to an application. Even though a page is allocated to the buffer cache pool, any buffer cache block that is in an invalid queue is essentially 'free' for allocation to an application for storing metadata and/or data of a file system. Further, a buffer cache descriptor includes a nhold and a generation count that helps label the buffer cache block with a revision number for creating a hint for the buffer cache block. Additionally, a buffer cache descriptor includes a link to a data block allocated from the volatile memory module indicating address of the data block.

In at least one embodiment of the current technique, page manager 122 allocates pages of the volatile memory module and provides the pages to applications. An application may require one or more pages of memory. Page manager 122 provides a common set of interfaces for accessing buffer cache blocks of the buffer cache pool and data log descriptors of a data transaction log.

In at least one embodiment of the current technique, global data block cache 126 ("GDBC") caches a set of data blocks of a file system in a volatile memory of file server 23 by managing a set of global data block cache descriptors (also referred to herein as "GDBC descriptor") such that each global data block cache descriptor may be mapped to a buffer cache block of the buffer cache pool such that the buffer cache block may store a data block of the set of data blocks. Thus, a GDBC descriptor entry functions in a similar way a buffer cache descriptor entry functions as described above herein. Further, a data block of a file of a file system that is cached in the GDBC 126, is also stored in a persistent journal such as data transaction log 130 associated with the file system. The data transaction log 130 is stored in a nonvolatile memory module that is persistent across reboots of file server 23. Further, GDBC 126 provides CFS 128 and file system I/O logic 124 consistent access to a set of data blocks cached in the buffer cache pool. Further, GDBC 126 uses a reference count mechanism and a hint mechanism for managing a set of buffer cache data blocks. Further, the size of global data block cache 126 is based on the size of the volatile memory module of file server 23.

In at least one embodiment of the current technique, data transaction log 130 provides a functionality for logging a set of data blocks associated with write I/O requests to a file system such that the set of data blocks are stored in a nonvolatile memory of file server 23. Further, data transaction log 130 provides a set of interfaces for storing a data block in a nonvolatile memory and maintaining a data log descriptor associated with the data block in a volatile memory of file server 23. Further, data transaction log 130 provides a common set of interfaces for accessing a set of data blocks of a file system irrespective of how the file system is implemented in a data storage system. Further, data transaction log 130 enables file server 23 to recover a file system when the file system is remounted. A file system may be remounted either after reboot of file server 23 or after successful unmount of the file system. Thus, in-memory descriptors list 132 manages a set of data log descriptors associated with a set of data blocks that are cached in a nonvolatile memory (such as persistent storage cache 134).

Further, in at least one embodiment of the current technique, data transaction log 130 provides a functionality to cache data of a file system in a nonvolatile memory of a data storage system such that the data storage system may be a file based data storage system or a block based data storage system. In case of a block based data storage system, data transaction log 130 may use a persistent storage such as a storage processor cache for storing contents of a file system. In case of a file based data storage system such as file server 23, a predefined address space of a file system is reserved for data transaction log 130. The storage for the predefined address space may be provisioned from a file system volume. Further, data stored in data transaction log 130 persists across reboots of a data storage system. Additionally, a data transaction log is associated with a single file system. Thus, data transaction log 130 is available for caching contents of a file system when the filesystem is mounted because the data transaction log is part of the address space of the file system.

A storage pool may be a collection of disks, which may include disks of different types. Storage pools may further be subdivided into slices; for example a 1 GB slice may be the allocation element for a logical unit. As well, a pool may be use synonymously with a storage tier. That is, both a storage tier and a pool may have storage devices of different performance capabilities and costs. As well, both may contain slices (also referred to as "data slices"). A slice may be considered the smallest element that can be tracked and moved. It may be advantageous to store the hot or most accessed data on the devices within the storage pool with the best performance characteristics while storing the cold or least accessed data on the devices that have slower performance characteristics. A disk may be a physical disk within the storage system. A LUN may be a logical unit number which is an identifier for a Logical Unit. Each slice of data may have a mapping on the location of the physical drive where it starts and ends.

Further, in at least one embodiment of the current technique, slices for a data transaction log are allocated from a storage tier including disks with the best performance characteristics. Further, a data transaction log for a file system may expand in size in order to store additional data of the file system by provisioning one or more slices from a storage pool. Further, a data transaction log for a file system may reduce in size when data of the file system that has been cached is committed to a storage device thereby releasing one or more slices back to a storage pool. Further, the minimum size of a data transaction log may be same as the size of a single slice of storage.

Figure 6:
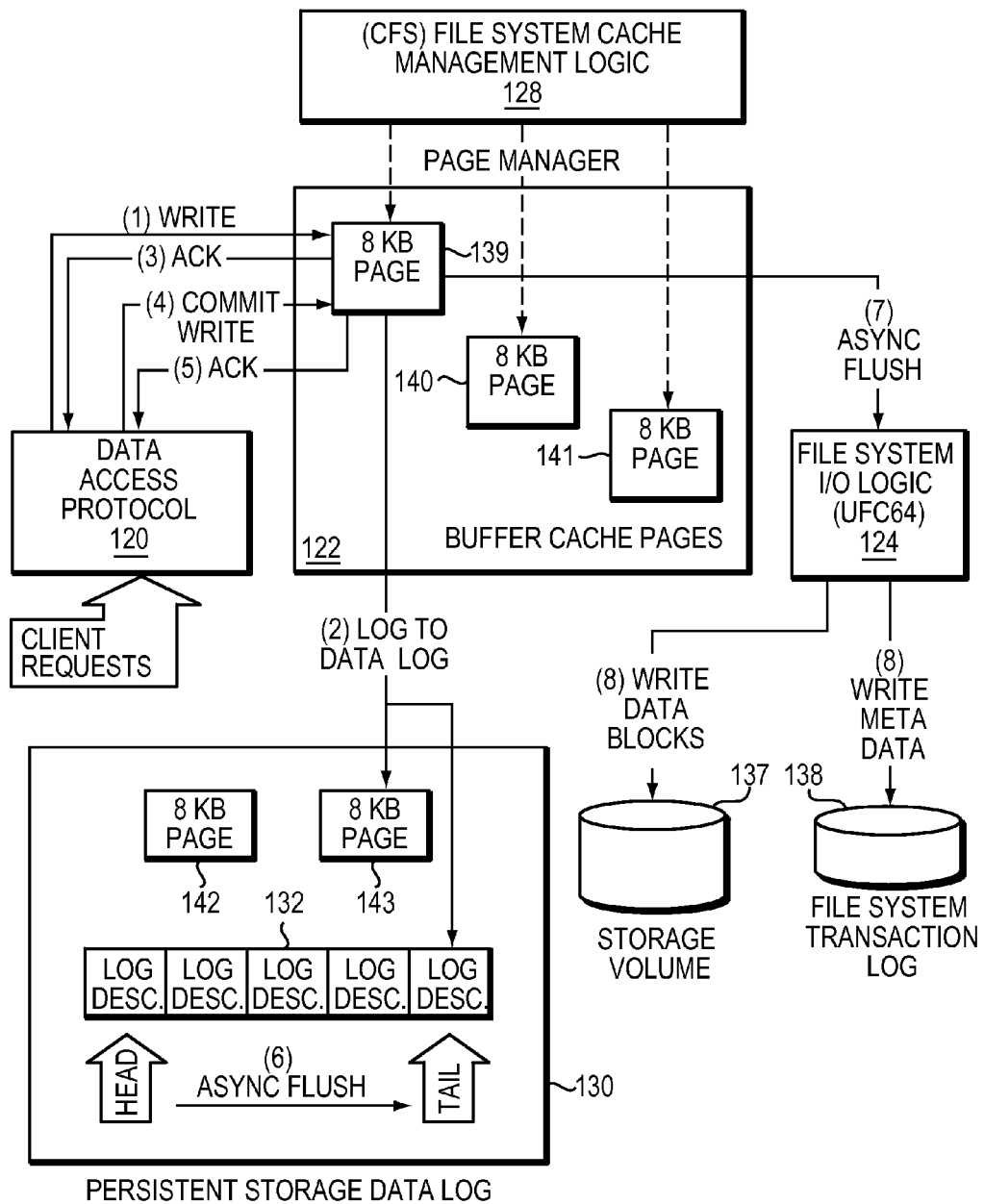

Referring to FIG. 6, shown is a detailed representation of components that may be included in an embodiment using the techniques described herein. A client issues an I/O request (e.g., read, write) to a file system using a data access protocol 120 (such as CIFS 42, NFS 41). The I/O request may attempt to modify on-disk contents of a file of the file system. If the I/O request is a stable write request, conventionally, changes to data of a file must be committed to the file stored on a persistent storage device before acknowledging the I/O request to the client. In such a conventional system, committing changes to a file of a file system stored on a persistent storage device includes writing data associated with an I/O request to the file stored on the storage device and writing metadata associated with the changes to a file system transaction log. Thus, in such a conventional case, committing changes to a file may increase a write latency for a client and decrease I/O performance.

By contrast, in at least some implementations in accordance with the current technique as described herein, writing data associated with an I/O request to a data transaction log stored on a persistent storage created from the fastest storage devices available and acknowledging the I/O request to a client before writing data to the file stored on a storage device and metadata to a file system transaction log shifts the overhead involved in writing to the storage device and the file system transaction log to a background process which executes separate from the I/O request. Further, in at least one embodiment of the current technique, a background process (also referred to as "flush process") commits data to the file system at a later time.

Thus, for example, in FIG. 6, after receiving the I/O request from the client, data associated with the I/O request (e.g., write) is cached in a buffer cache block 139 of the buffer cache pool. Further, the data is written to a data block 142 and stored in a data transaction log 130 associated with the file system. Further, information regarding the data block 142 and the buffer cache block 139 is stored in a global data block cache descriptor. Additionally, a data log descriptor 132 is created and associated with the global data block cache descriptor. Further, the data log descriptor 132 is added to a list of log descriptors that are flushed by a background process at a later time. The client sends the request for an acknowledgement of completion of the I/O request, and the request to commit the data to a storage device. The data storage system provides the acknowledgement to the client indicating that the I/O request has completed successfully. After providing the acknowledgment, a background flush process writes the data cached in the buffer cache block 139 to the storage device 137. The background flush process may be executed at a specified time based on a criteria such as a threshold value. The background flush process writes data stored in the buffer cache block 139 to the storage volume 137 and writes metadata associated with the data to file system transaction log 138. Further, in a least one embodiment of the current technique, a data log descriptor is associated with a global data block cache descriptor and the global data block cache descriptor is associated with the buffer cache block. As a result, a data storage system uses data log descriptor to determine buffer cache data blocks cached in the global data block cache that are required to be flushed to a storage device.

Further, data log descriptors 132 are created in volatile memory of the data storage system and the data transaction log stored on a persistent storage is apportioned into chunks as described below herein in FIG. 10.

Figure 7:
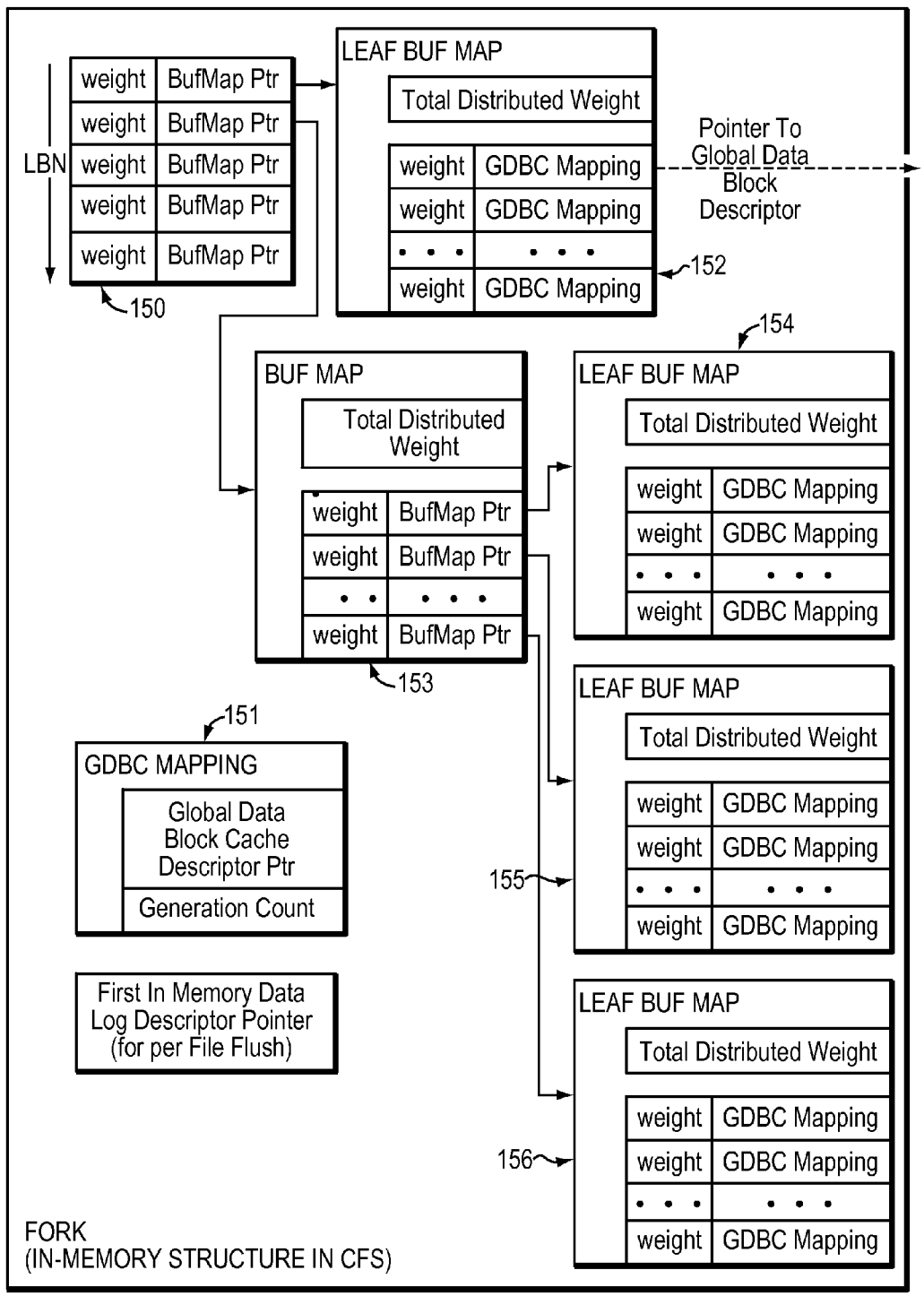

Referring to FIG. 7, shown is a detailed representation of components that may be included in an embodiment using the techniques described herein. With reference also to FIG. 6, a file fork object is created in a memory of a data storage system for each file of a file system. A file fork object associated with a file includes a hierarchal list 150 of pointers such that each pointer of the hierarchical list 150 points to a buffer mapped object (also referred to herein as "bufmap"). The hierarchical list 150 (also referred to as "bufmap table") is indexed based on a logical block number for a file. The first entry in the bufmap table 150 points to a level-1 bufmap object 152 (also referred to herein as "leaf bufmap object") that includes a set of entries such that each entry includes a weight and a mapping to a global data block cache descriptor cached in the global data block cache 126. The second entry of the bufmap table 150 points to a level-2 bufmap object 153 that includes a set of entries such that each entry includes a weight and a pointer to a level-1 bufmap object (e.g., a leaf bufmap object). For example, the first entry of the set of entries 153 points to leaf bufmap object 154 which further includes a set of entries, each entry of the set of entries including a mapping to a global data block cache descriptor cached in the global data block cache 126. Similarly, the second entry of the set of entries 153 points to leaf bufmap object 155, the third entry of the set of entries 153 points to leaf bufmap object 156, and so on. A mapping stored in an entry of a leaf bufmap object includes information such as a pointer to a global data block cache descriptor and a generation count. The pointer to a global data block cache descriptor includes a NULL pointer if a buffer cache block associated with the global data block cache descriptor is not cached in the global data block cache 126 and/or a data transaction log. Each entry of the bufmap table 150 is updated when a data block of a file is cached in the global data block cache upon receiving a write I/O request. Thus, in at least one embodiment of the current technique, a file fork object maintains an in-memory list of GDBC descriptor entries such that each GDBC descriptor entry points to a buffer cache block cached in global data block cache 126.

Figure 8:
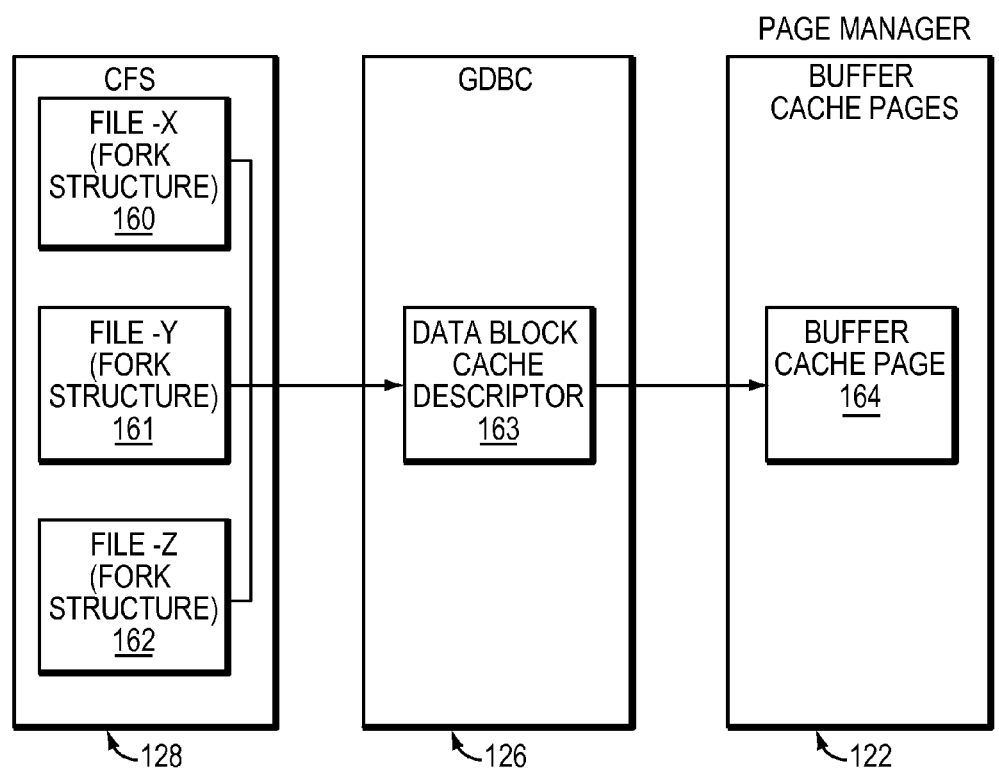

Referring to FIG. 8, shown is a detailed representation of components that may be included in an embodiment using the techniques described herein. With reference also to FIGS. 5-7, in at least one embodiment of the current technique, file system cache management logic 128 includes an in-memory file fork object for each file of a file system of a data storage system. For example, in FIG. 8, a file fork object 160 represents a file named "file-X", a file fork object 161 represents a file named "file-Y", and a file fork object 162 represents a file named "file-Z". Each file fork object includes information regarding global data block cache descriptors such that each global data block cache descriptor 163 is associated with a buffer cache block 164 that is cached in the buffer cache pool provided by page manager 122. Further, for example, if a data block is deduplicated and shared by file-X, file-Y, and file-Z, file fork objects 160-162 for respective files includes mapping information such that each file fork object 160-162 points to the same data block cache descriptor 163 by referring to the same GDBC descriptor entry thereby eliminating or reducing the need to maintain duplicate data blocks that may include identical contents.

Figure 9:
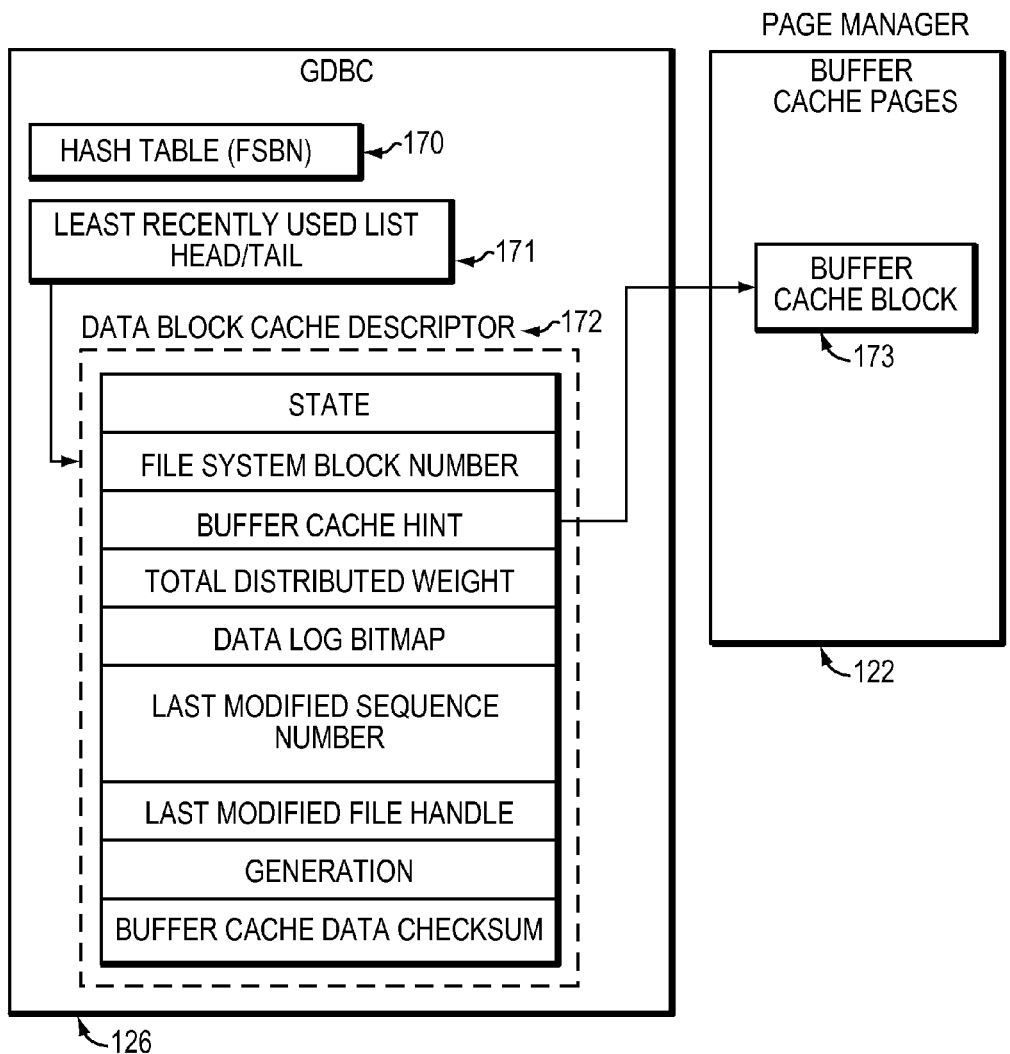

Referring to FIG. 9, shown is a detailed representation of components that may be included in an embodiment using the techniques described herein. With reference also to FIGS. 5-7, in at least one embodiment of the current technique, the global data block cache 126 is represented by global block hash table 170 for storing information regarding buffer cache blocks that are cached in the buffer cache pool provided by page manager 122. For example, global block hash 170 may be organized as a set of hash buckets such that each bucket of the set of hash buckets includes one or more entries including information for a global data block cache descriptor that is accessed by a hash key. A hash key may be based on a file system block number of a file. The global block hash enables file fork objects that share data blocks to be associated with a single instance of a data block. The global block hash 170 may grow to a predefined size based on an amount of available memory of file server 23 by reading a data of a file from a disk, storing contents of the data in a buffer cache data block entry, and storing information for the buffer cache data block in the global data block cache 126 by associating a global data block cache descriptor with the buffer cache block and adding the global data block cache descriptor to global block hash 170. Further, the global data block cache 126 may maintain a set of global data block cache descriptors in a least recently used manner such that a least recently used list 171 tracks the global data block cache descriptors included in global block hash 170. A global data block cache descriptor 172 is associated with a buffer cache block 173 cached in the buffer cache pool. Further, in at least one embodiment of the current technique, a global data block cache descriptor 172 includes information such as a file system block number associated with data stored in a buffer cache block associated with the descriptor 172, a buffer cache hint for determining validity of contents of the buffer cache block, a total distributed weight indicating sharing relationship of the buffer cache block, a data log bitmap, a last modified sequence number, a last modified file handle, a generation count, and a buffer cache checksum value. A hint is used for determining validity of contents of a buffer cache block. An invalid hint indicates that contents of the buffer cache block are no longer valid and may need to be updated by reading data from a storage device. Further, generation count in a GDBC mapping stored in a file fork object indicates whether a GDBC descriptor indicated by the GDBC mapping has been recycled by the data storage system.

Generally, a storage pool may be a collection of disks, which may include disks of different types. A storage pool may further be subdivided into slices; for example a 1 GB slice may be the allocation element for a logical unit. As well, a pool may be use synonymously with a storage tier. That is, both a storage tier and a pool may have storage devices of different performance capabilities and costs. As well, both may contain slices (also referred to as "data slices"). A slice may be considered the smallest element that can be tracked and moved. It may be advantageous to store the hot or most accessed data on the devices within the storage pool with the best performance characteristics while storing the cold or least accessed data on the devices that have slower performance characteristics.

Figure 10:
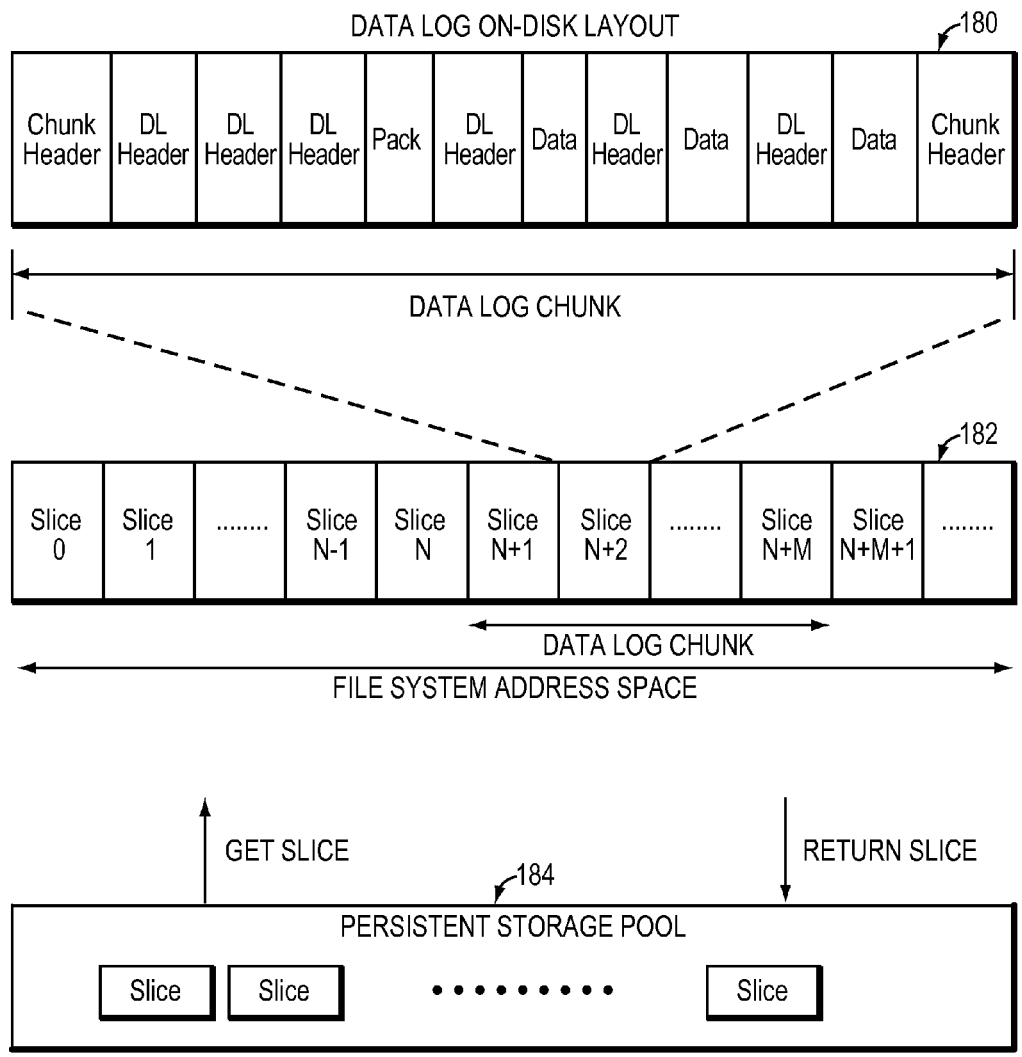

Referring to FIG. 10, shown is a detailed representation of components that may be included in an embodiment using the techniques described herein. In example 180, FIG. 10 illustrates an example on-disk layout of a data transaction log associated with a file system. A storage space is reserved in an address space 182 of a file system for storing a data transaction log for that file system such that when the file system is mounted in a data storage system, a slice (also referred to herein as "data log slice") is automatically provisioned (or "allocated") and assigned to the data transaction log. Thus, an address space of a data transaction log for a file system includes a set of slices such that the slices provisioned for the data transaction log becomes part of an address space of the file system. For example, file system address space 182 includes a set of slices (e.g., "m" number of slices) such that slice 0 to slice "n" includes data and/or metadata of the file system and the data transaction log 180 is stored from slice "n+1" to slice "n+m" where n and m can be any numbers greater than or equal to 1.

In at least one embodiment of the current technique, the size of a data log slice may be less than 1 gigabytes (e.g., 256 megabytes). A set of slices are provisioned for each file system as data log slices from a storage pool 184 such that the file system may allocate a slice from the set of slices to a data transaction log associated with the file system. Further, a file system may request a slice for a data transaction log only when the file system needs storage space to cache data blocks in the data transaction log. Further, a slice may be returned back to a storage pool when buffer cache blocks associated with data blocks of the slice are flushed from the global data cache to a storage device. Additionally, a slice for a data transaction log may be selected from a storage tier of a storage pool such that the storage tier includes disks with best performance characteristics.

Further, in at least one embodiment of the current technique, a data transaction log is apportioned into a number of sections (also referred to herein as "chunks"). Each section of a data log transaction may be of different size. Further a section of a data transaction log includes a number of data transaction log records. Further, a data log slice provisioned for a data transaction log may store a number of sections based on the size of each section and the size of the data log slice. Alternatively, a section of a data transaction log may require a number of data log slices to store contents of the section based on the size of the section and each data log slice. Each section of data transaction log starts by storing a chunk header followed by a number of data log headers. For example, a section may include a chunk header followed by one thousand data log headers. The first portion of a section of a data transaction log includes a chunk header and a set of data log headers. The first portion is referred to as a header portion. Further, the size of a header portion of each section is of the same size. The second portion of the section of the data log transaction log following the header portion is referred to as a record portion and includes a number of data log records. Each data log record includes a data log header and data such that the data log header includes information regarding the data. Because the size of data stored in a data log record may vary based on an I/O request, the size of the data log record varies as well based on the size of data. As a result, the size of a record portion of each section of a data transaction log may vary based on the size of each data log record in the second portion. Consequently, the size of each section may vary based on the size of the record portion of the section. Thus, it should be noted that a section of a data log slice of a data transaction log does not reside beyond a slice boundary and the data log slice starts with a chunk header.

Further, in at least one embodiment of the current technique, a data log write operation to a data transaction log writes data to the record portion of a section of the data transaction log. When the record portion of a section can not store any more data log records, the header portion of the section is updated with a chunk header and a subset of data log headers that have been written to the record portion. Thus, the next data log header is written to the record portion of the next section.

Thus, a data transaction log is organized on a disk in such a way that optimizes a data log write operation, recovery of a file system and flushing of data blocks to a storage device. Further, when the file system is remounted, a process that recovers a data transaction log associated with a file system may read data log headers stored in the chunk header located at the start of a section in a single read I/O operation thereby enabling faster recovery of the file system because each data log header is stored followed by a data log header in the chunk header. As a result, a recovery process can read, for example, hundreds of data log headers in a single read I/O operation because no data is stored between two data log headers in the chunk header of a section. Thus, a recover process uses a set of data log headers stored together in the chunk header of a section of a data log transaction to efficiently read data associated with the set of data log headers thereby allowing faster recovery of a file system. However, the last section of a data transaction log does not include a chunk header. Instead, the last section of the data transaction log includes a set of data log records such that each data log record includes a data log header and data.

Further, in at least one embodiment of the current technique, a data storage system logs data associated with each write I/O operation to a data transaction log by writing a data log header and the data to the data transaction log. Further, in at least one embodiment of the current technique, a data log descriptor tracks each modification performed on a set of data blocks that are associated with a write I/O request. A write I/O request may modify multiple data blocks of a file such that each data block is associated with a global data block cache ("GDBC") descriptor entry which is cached in the global data block cache 126. Thus, a data log descriptor manages a list of GDBC entries that are cached by a write I/O request.

Figure 11:
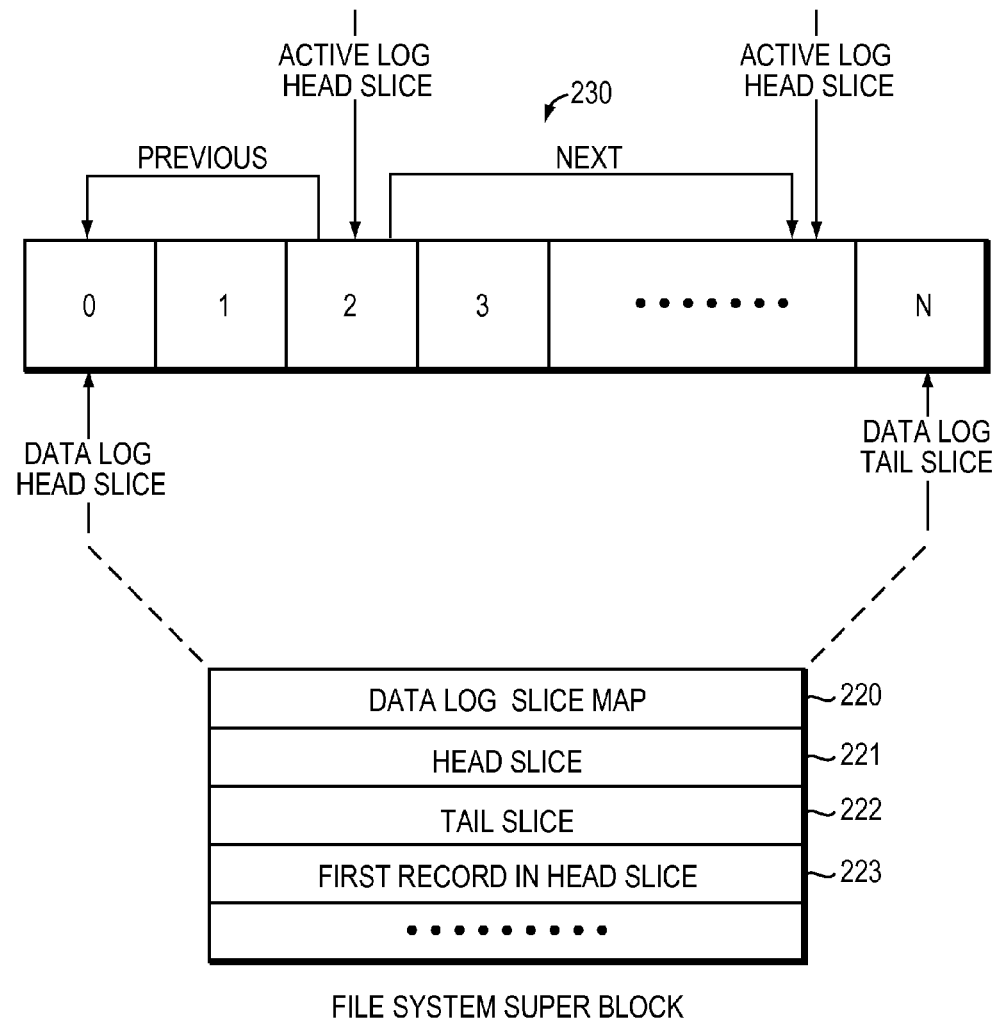

Referring to FIG. 11, shown is a detailed representation of components that may be included in an embodiment using the techniques described herein. With reference also to FIGS. 1-10, in at least one embodiment of the current technique, metadata of a file system such as a file system super block 72 includes information regarding a data transaction log associated with the file system. The information in the file system super block 72 of a file system includes data log slice map 220 indicating information regarding slices provisioned for a data transaction log associated with the file system, head slice 221 indicating the first slice in a list of data log slices allocated to the data transaction log, tail slice 222 indicating the last slice in a list of data log slices provisioned for the data transaction log, and first record in the head slice 223. In at least one embodiment of the current technique, slices used by a data transaction log for a file system may be organized in a doubly linked list referred to as an active slice list such that the doubly-linked list includes back pointers in each entry, starting from the tail entry and proceeding to the head entry, with each back pointer pointing at the previous entry. The head pointer of the doubly linked list is referred to as an active log head slice and the tail pointer of the double linked list is referred to as an active log tail slice. Further, slices that are provisioned for a data transaction log of a file system but not in use by the data transaction log are organized as a linked list of free slices such that a free slice head points to the first slice in the linked list of free slices. A slice released by the data transaction log as a free slice is added to the front of the linked list and a slice at the front of the linked list is allocated to the data transaction log when requested by the data transaction log. Slices that are not provisioned for a data transaction log are organized as a linked list referred to as an un-provisioned slice list such that a head pointer points to the first slice in the un-provisioned slice list. When a slice is provisioned for a file system, the slice is removed from the un-provisioned slice list and added to the linked list of free slices. The active slice list, free slice list and un-provisioned slice list are stored in a data storage system as part of metadata and thus persist across reboots of the data storage system. A file system manages two bitmaps such that each bitmap represents the free and un-provisioned slice lists respectively. The active slice list is stored on a storage device in a tabular format such that each entry of the table includes an active slice identifier based on an order in which slices are organized in the active slice list. Further, a file system super block 72 includes information regarding location of the first chunk header of a data transaction log.

When a data transaction log is flushed to a storage device, each section of the data transaction log is processed. In order to determine the next section after reading the first chunk header from file system super block 72, if the next chunk resides in the same slice as the current chunk that is being processed, the next chunk may be determined based on the size of the current chunk. However, if the next chunk resides in the next data log slice, the next chunk may be located at the end of the chunk header in the next data log slice. The next data log slice may be determined from the active slice list.

Further, in at least one embodiment of the current technique, a data log transaction stores changes to a file of a file system in a data transaction log associated with the file system upon receiving a write I/O request. Further, a data log transaction is represented by a data log descriptor. A data log descriptor may include a set of data log records as a write I/O operation may include multiple changes to the file such that each change in data is represented by a data log record. Thus, a data log transaction tracks modifications to a set of data blocks that are associated with a write I/O request. A log hold (also referred to herein as "reference") is taken on each data block entry of a data transaction which is also referred to as a dirty data block. When a dirty data block is flushed to a storage device, the log hold is released for the dirty data block and a reference count of a data log descriptor associated with the dirty data block is decremented. Further, each data log descriptor includes a reference to a slice in the active slice list. When dirty data blocks for a data log transaction are flushed to a disk, a data log descriptor associated with the data log transaction is released which in turn releases the reference the data log slice that stores the data log descriptor. When each references to an active data log slice is released, the active data log slice is added to the free slice list and becomes available as a free slice that may be allocated by the data transaction log.

Further, each data log record associated with a data log transaction must reside in the same section of a data transaction log. Thus, a data storage system performs a check for determining availability of storage space for storing a data log transaction prior to writing a data log record in the data transaction log. If a current section does not have sufficient space available to store each data log record associated with a data log transaction, the data log records are stored in the next available section that has sufficient space available for storing the data log records.

A data log transaction is written at the logical end of a data transaction log indicated by an active log tail offset of an active log tail slice which is stored in an in-memory file system object. The active log tail offset is updated each time a data log transaction stored at the position indicated by the active log tail offset has been flushed to a disk. The active log tail offset includes information such as a tail slice identifier number, a tail chunk identifier number and a tail chunk offset. When the active log tail slice of a data transaction log is completely written to, a new slice is allocated from the free slice list such that the new slice becomes the new active log tail slice of the data transaction log. If the free slice list is empty, a new slice is removed from the un-provisioned slice list and added to the free slice list. In case, the un-provisioned slice list is empty, the next data log transaction is written to a data log head slice if the data log head slice includes storage space for writing a data log header associated with the next data log transaction. Thus, a data transaction log is organized as a circular log that wraps around when the data transaction log is unable to expand by requesting additional data log slices. Thus, in at least one embodiment of the current technique, if a pointer pointing to the next slice to which a data log descriptor associated with an incoming write I/O request may be written to is same as the head slice, the data transaction log requests a new slice.

Further, in at least one embodiment of the current technique, if a data storage system is a block based data storage system, a data log header is saved as an opaque data as part of a page descriptor in a cache of a storage processor. The cache of a storage processor includes a mapping between a physical data block and a page of the cache associated with the physical data block such that the mapping uses a page identifier object. A data log header may be mapped to a page identifier object. Further, in such a case, a data log header does not store information regarding updates made to a physical data block as part of a write I/O operation. The cache of a storage processor maintains a bitmap in each page that stores information regarding updates that have been made to data of a data block. Each unbound page that stores a data log header includes a unique identifier which further includes a file system identifier number for a LUN. There may be one or more pages associated with a single physical data block, such that a page is generated for a write modification that is performed on the physical data block.

Figure 12:
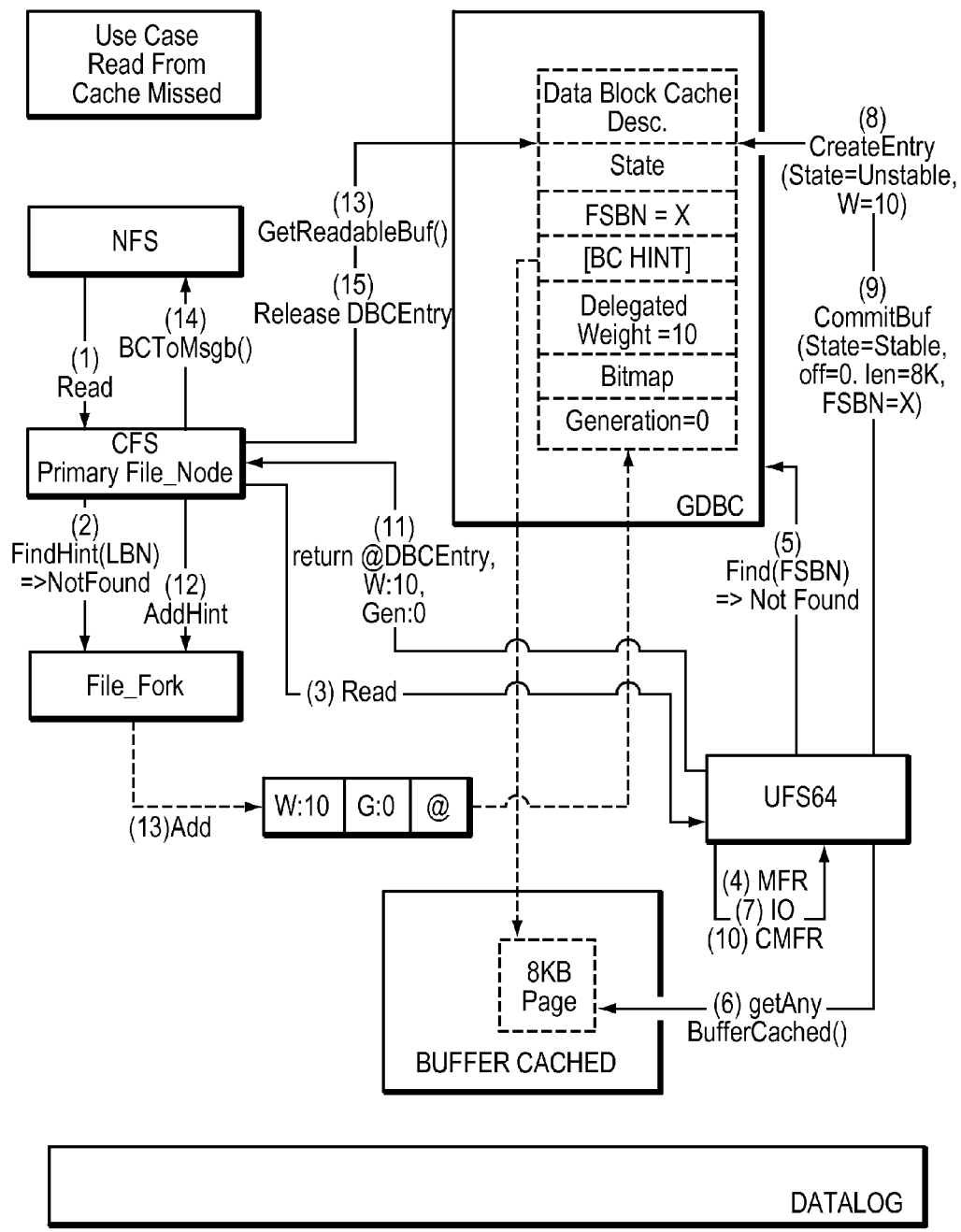

Referring to FIG. 12, shown is a detailed representation of components that may be included in an embodiment using the techniques described herein. FIG. 12 illustrates a use case scenario in which a client sends a read I/O request such that data associated with the read I/O request is not cached in the global data block cache of a data storage system. With reference also to FIGS. 5-11, a client (such as a NFS client) sends a read I/O request to a data storage system. Upon receiving the read I/O request for reading data of a file of a file system at a specified file offset, the file system cache management logic ("CFS") 128 attempts to find reference (or "hint") to a data block in a file fork object associated with the file. The CFS 128 checks the bufmap table of the file fork object by using a logical block number associated with the file offset. Upon determining that an entry associated with the logical block number does not exists in the file fork object, the data storage system issues a read request to file system I/O logic 124. The file system I/O logic 124 first performs a mapping operation in order to determine a file system block number ("FSBN") associated with the logical block number of data that needs to be read from a storage device. Then, based on the file system block number, a determination is made as to whether a global data block cache descriptor exists in the global data block cache 126 such that the global data block cache may refer to a buffer cache block including data associated with the read I/O request. Upon determining that no such global data block cache descriptor exists in the global data block cache 126, a buffer cache block is allocated from the buffer cache pool provided by page manager 122. A read I/O operation is performed on a storage device to read the data of the file associated with the read I/O request. The data read from the storage device is written to the buffer cache block. A global data block cache descriptor entry is created in the global data block cache 126. The newly created GDBC descriptor entry is initialized by associating a buffer cache block with the global data block cache descriptor entry. Further, a commit buffer operation is performed in order to update information of the GDBC descriptor entry such as an offset, a length, a file system block number and a state. The file system I/O logic 124 finishes the read I/O operation successfully by releasing resources that may have been held in order to read the data from the storage device. Information regarding the global data block cache descriptor entry is provided to file system cache management logic ("CFS") 128 such that the file fork object adds a hint for the buffer cache block. CFS 128 provides the buffer cache block to the client such that the client can read data from the buffer cache block. When the client finish accessing the data, the hold on the GDBC descriptor entry is released. A hold prevents a GDBC descriptor entry from being recycled by a data storage system. If the value of a hold for a GDBC descriptor entry reaches zero, the GDBC descriptor entry become eligible for recycling by a data storage system.

Figure 13:
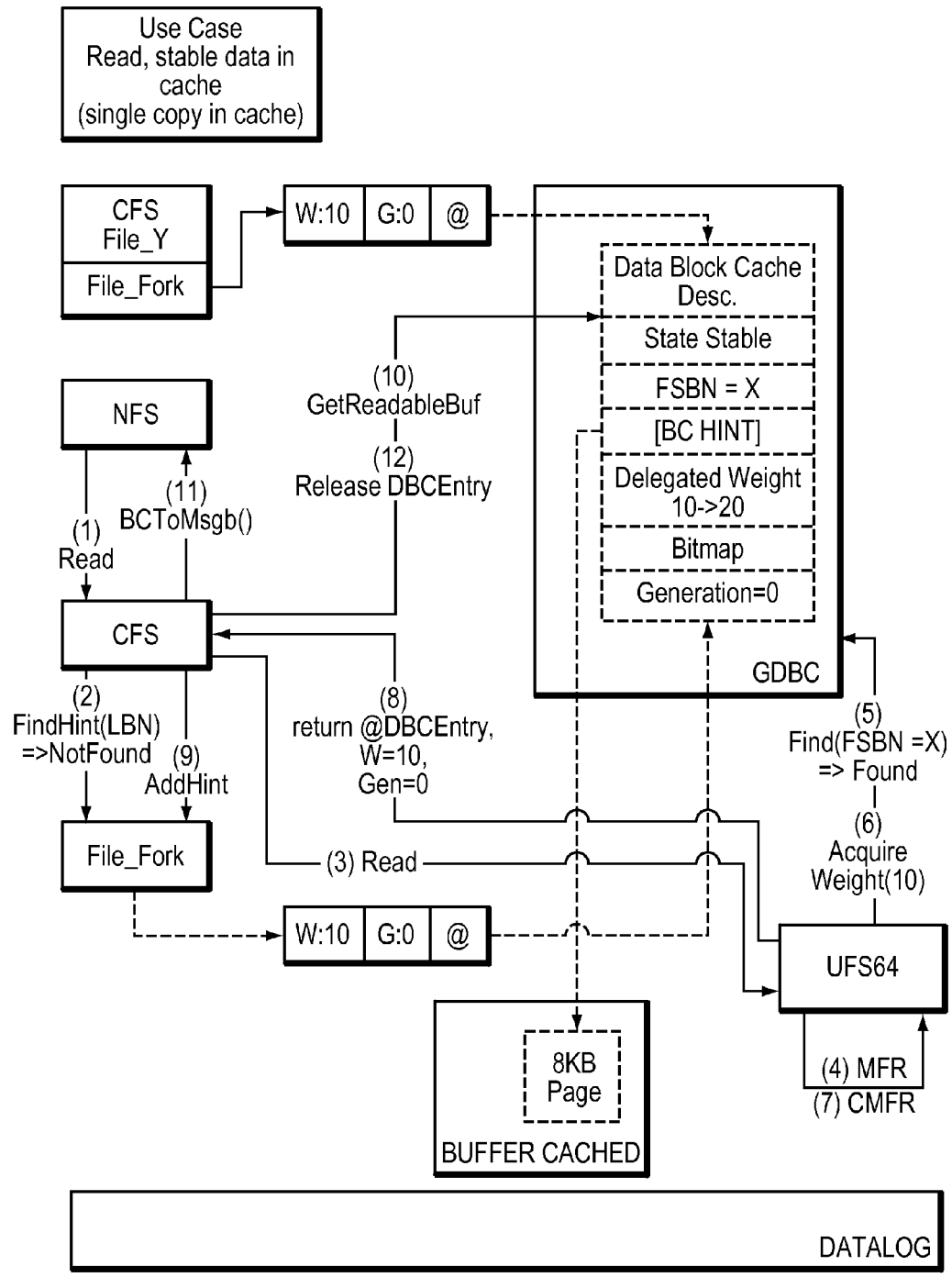

Referring to FIG. 13, shown is a detailed representation of components that may be included in an embodiment using the techniques described herein. FIG. 13 illustrates a use case scenario in which a client sends a read I/O request such that data associated with the read I/O request is cached in the global data block cache of a data storage system. With reference also to FIGS. 5-11, a client (such as a NFS client) sends a read I/O request to a data storage system for reading data of a file (e.g. "file-X") of a file system. Upon receiving the read I/O request, the file system cache management logic ("CFS") 128 attempts to find reference (or "hint") to a data block in a file fork object associated with the file. The CFS 128 checks the bufmap table of the file fork object by using a logical block number associated with data requested by the client. Upon determining that an entry associated with the logical block number does not exists in the file fork object, the data storage system issues a read request to file system I/O logic 124. The file system I/O logic 124 first performs a mapping operation in order to determine a file system block number ("FSBN") associated with the logical block number of data that needs to be read from a storage device. Then, based on the file system block number, a determination is made as to whether a global data block cache descriptor exists in the global data block cache 126 which may include the data associated with the read I/O request. Upon determining that such global data block cache descriptor ("GDBC") entry does exist in the global data block cache 126 indicating that another file (e.g., "file-Y") may have a reference to the global data block cache descriptor, the data storage system updates a weight of the GDBC descriptor entry. The file system I/O logic 124 finishes read operation successfully by releasing resources that may have been held in order to read the data from the storage device. Information regarding the global data block cache descriptor entry is provided to file system cache management logic ("CFS") 128 such that the file fork object adds a hint for the buffer cache block. CFS 128 provides the buffer cache block to the client such that the client can read data from the buffer cache block. When the client finish accessing the data, the reference to the GDBC descriptor entry is released. In at least one embodiment in accordance with the current technique, a single buffer cache block resides in the global data block cache 126 even when two or more files (e.g. file-X and file-Y) refer to the same data block.

Figure 14:
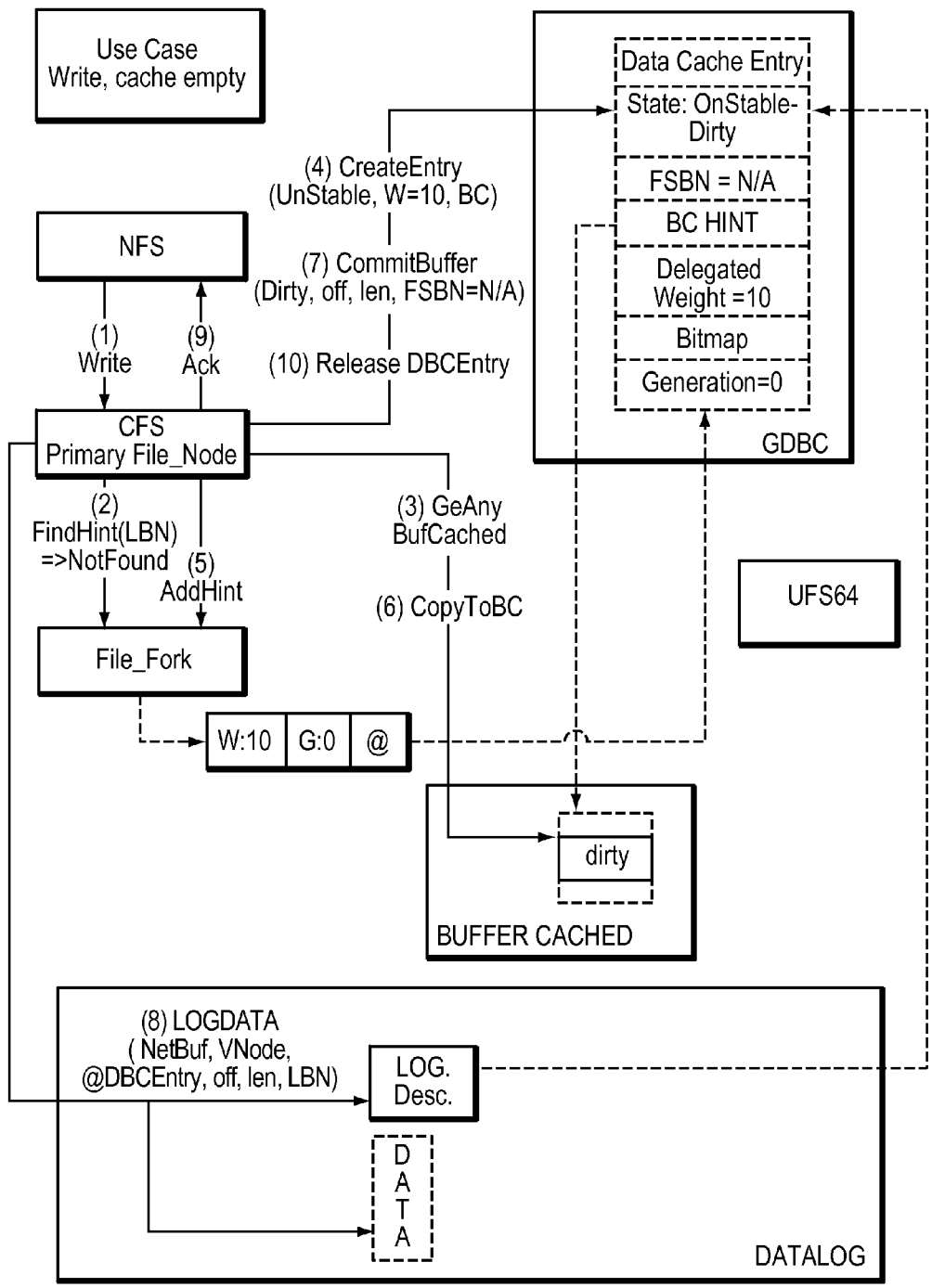

Referring to FIG. 14, shown is a detailed representation of components that may be included in an embodiment using the techniques described herein. FIG. 14 illustrates a use case scenario in which a client sends a write I/O request such that data associated with the write I/O request is not cached in the global data block cache of a data storage system. With reference also to FIGS. 5-11, a client (such as a NFS client) sends a write I/O request to a data storage system. Upon receiving the write I/O request, the file system cache management logic ("CFS") 128 attempts to find reference (or "hint") to a data block in a file fork object. The CFS 128 checks the bufmap table of the file fork object by using a logical block number associated with a file offset indicated by the write I/O request. Upon determining that an entry associated with the logical block number does not exists in the file fork object, a request to allocate a buffer cache block is issued to page manager 122 such that a global data block cache ("GDBC") descriptor entry is created in the global data block cache 126 and associated with the newly created buffer cache block. The file fork object adds a hint for the buffer cache block. Data associated with the write I/O request is copied to the newly allocated buffer cache block starting at a position within the buffer cache block that corresponds to the specified offset provided by the write I/O request. Thus, it should be noted that a buffer cache block may be partially filled based on the size of data written to the buffer cache block as part of a write I/O request. A commit buffer operation is performed that updates information in the GDBC descriptor entry and the buffer cache block is marked as a dirty buffer indicating that on-disk contents of the file has not been updated yet. Further, CFS 128 performs a data log transaction that writes data to a data transaction log associated with the file system. The data is written to a section of the data transaction log as described above in FIG. 10 herein. Further, a data log descriptor is created and associated with the data written to the data transaction log. The data log descriptor is associated with the GDBC descriptor entry. Then, CFS 128 sends an acknowledgement to the client indicating successful completion of the write I/O request. Thus, on-disk contents of the file may be updated at a later time by a flush process that may execute in background asynchronous with the write I/O operation.

Figure 15:
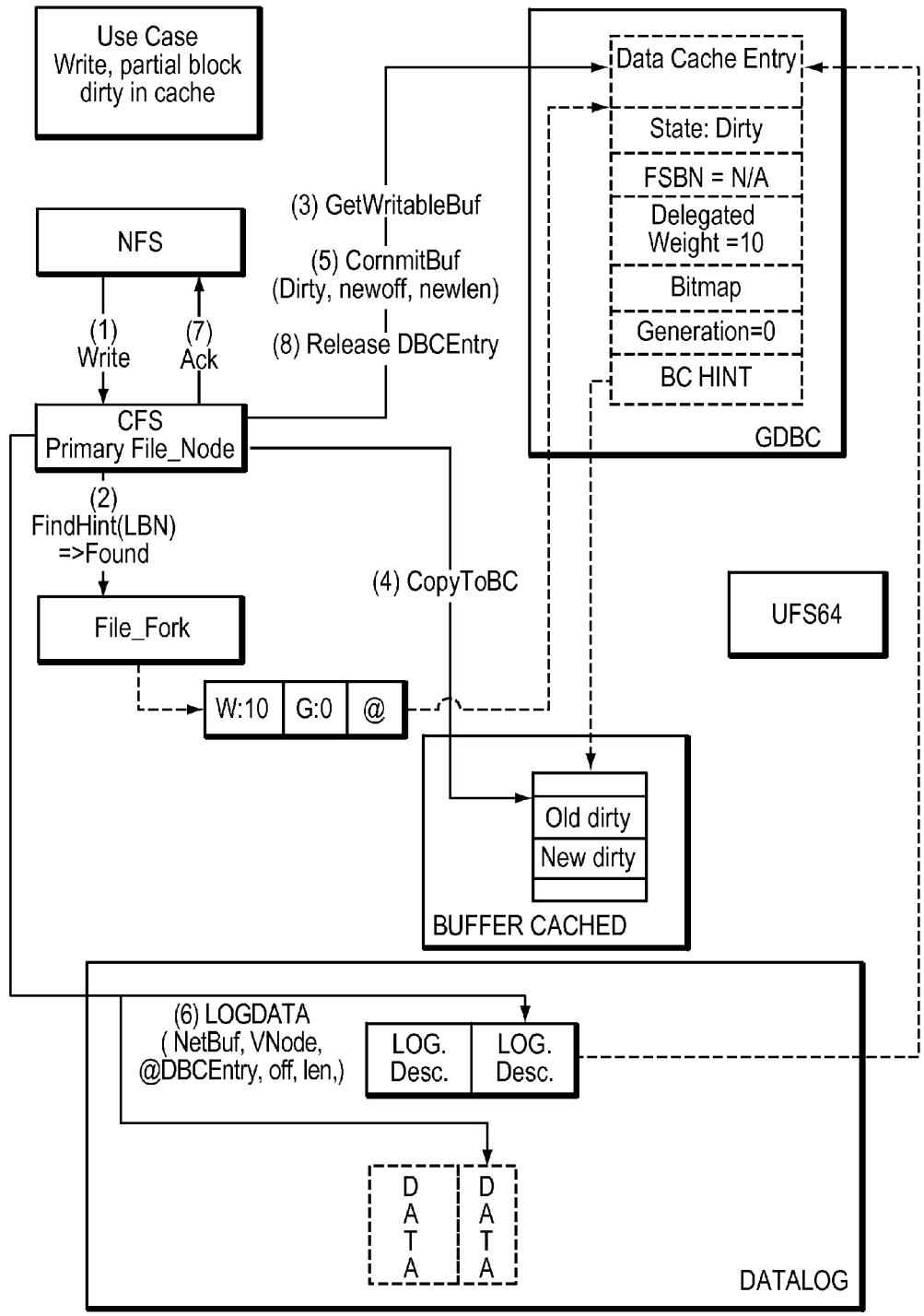

Referring to FIG. 15, shown is a detailed representation of components that may be included in an embodiment using the techniques described herein. FIG. 15 illustrates a use case scenario in which a client sends a write I/O request such that a data block to which the write operation is directed to is partially available in the global data block cache of a data storage system and is marked as a dirty buffer. With reference also to FIGS. 5-11, a client (such as a NFS client) sends a write I/O request to a data storage system. Upon receiving the write I/O request for writing data to a file of a file system at a specified file offset, the file system cache management logic ("CFS") 128 attempts to find reference (or "hint") to a data block in a file fork object associated with the file such that the data block may include the specified offset associated with the write I/O request. The CFS 128 checks the bufmap table of the file fork object by using a logical block number associated with the specified offset. Upon determining that a reference to a GDBC descriptor corresponding to the logical block number does exist in the file fork object, CFS 128 requests a writable reference for a buffer cache block associated with the GDBC descriptor entry. The buffer cache block may include previous data (also referred to herein as "old data") that has been marked dirty indicating that the previous data has not been flushed to a storage device yet. CFS 128 writes the data (also referred to herein as "new data") associated with the write I/O request to the buffer cache block. The location at which the new data is written may either be contiguous or non-contiguous to the location at which the old data is stored. A commit buffer operation is performed. The new data is marked as dirty data. Then, CFS 128 performs a data log transaction that writes the new data to a data transaction log associated with the file system. The new data is written to a section of the data transaction log as described above in FIG. 10 herein. Further, a data log descriptor is created and associated with the data written to the data transaction log. The data log descriptor is associated with the GDBC descriptor entry. Then, CFS 128 sends an acknowledgement to the client indicating successful completion of the write I/O request. Thus, on-disk contents of the file may be updated at a later time by a flush process that may execute in background asynchronous with the write I/O operation. Further, a background flush process may aggregate two data blocks for the old data and the new data.

Figure 16:
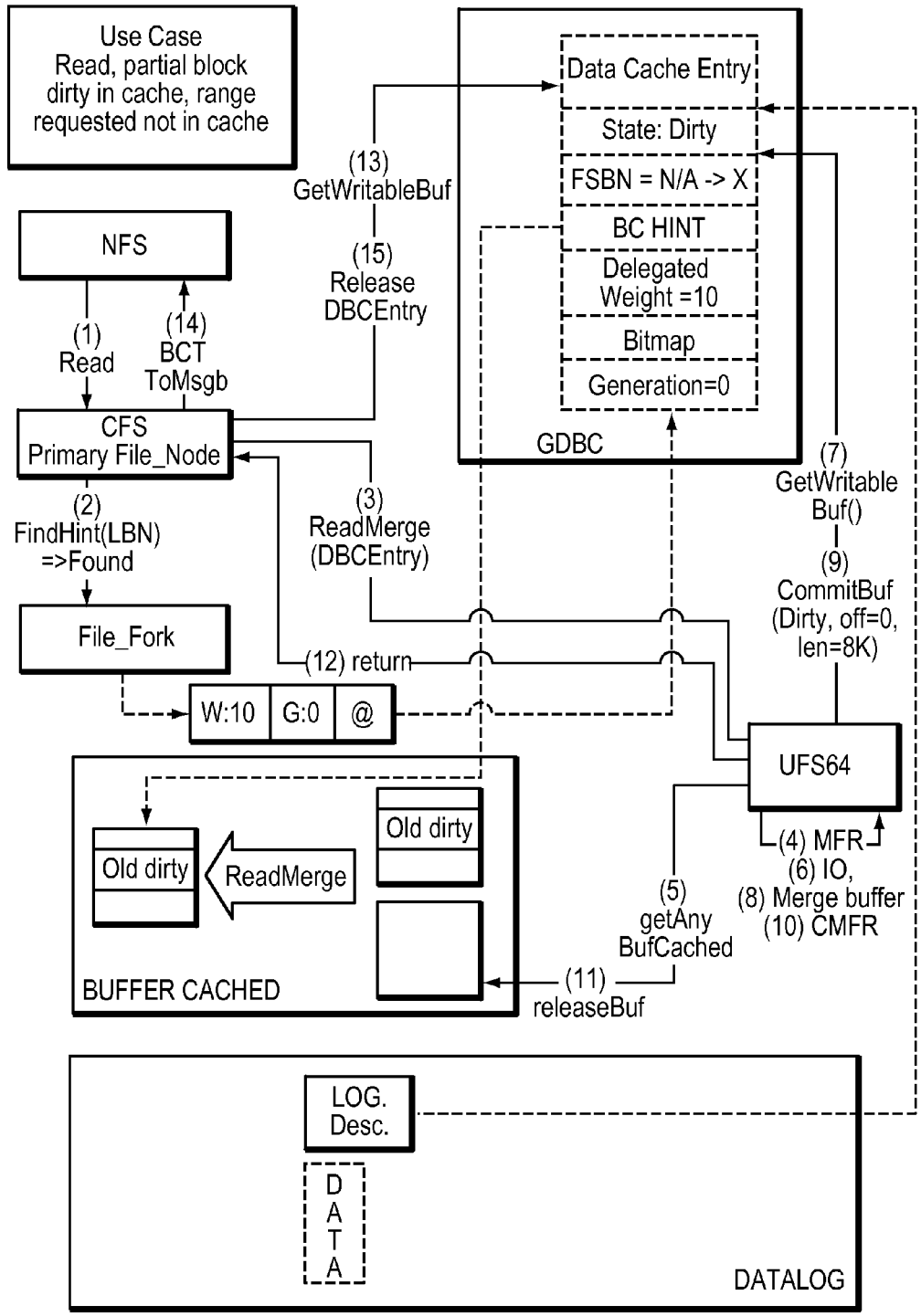

Referring to FIG. 16, shown is a detailed representation of components that may be included in an embodiment using the techniques described herein. FIG. 16 illustrates a use case scenario in which a client sends a read I/O request such that a data block for which the read I/O request is sent is cached in the global data block cache of a data storage system but the data block does not include entire data required for completing the read I/O request. With reference also to FIGS. 5-11, a client (such as a NFS client) sends a read I/O request to a data storage system for reading data of a file (e.g. "file-X") of a file system. Upon receiving the read I/O request, the file system cache management logic ("CFS") 128 attempts to find reference (or "hint") to a data block in a file fork object associated with the file. The CFS 128 checks the bufmap table of the file fork object by using a logical block number associated with a file offset provided by the read I/O request. Upon determining that a buffer cache block does reside in the global data block cache 126 and the buffer cache block does not include a portion of data required for the read I/O operation, the CFS 128 issues a read-merge request to file system I/O logic 124. Further, the buffer cache block found in the global data block cache 126 includes a subset of data required to complete the read I/O request and the portion of data stored in the buffer cache block has been marked as dirty data. Such buffer cache block is referred to as a partial buffer cache block. A read-merge operation reads data from a range of a file system in one or more data blocks of size 8 KB each such that the one or more data blocks include data starting at an offset specified by a read I/O request, and the one or more data blocks are updated based on the read I/O request thereby creating a read cache that may be used to process a read I/O request for the range of the file system. The file system I/O logic 124 first performs a mapping operation in order to determine a file system block number ("FSBN") associated with the logical block number of data that needs to be read from a storage device. A new buffer cache block is allocated from the buffer cache pool provided by page manager 122. File system I/O logic 124 performs a read operation in order to retrieve data of the file starting at the specified file offset from a storage device. The data read from the storage device is written to the newly allocated buffer cache block. The file system I/O logic 124 requests a writeable reference for the newly allocated buffer cache block in order to update contents of the buffer cache block. The file system I/O logic 124 performs a read-merge operation that modifies contents of the newly allocated buffer cache block with old dirty data from the partial buffer cache block thereby merging old data that has not been flushed to the storage device with new data read from the storage device. A commit buffer operation is performed. The file system I/O logic 124 finishes the read-merge operation successfully by releasing resources that may have been held in order to read the data from the storage device. A reference to the partial buffer cache block is released. CFS 128 provides the new buffer cache block to the client such that the client can read data from the buffer cache block. When the client finish accessing the data, the reference to the GDBC descriptor entry is released. Thus, a read-merge operation ensures that a client can access up-to-date contents of a file when a subset of data requested by the client has not been flushed to a storage device.

Figure 17:
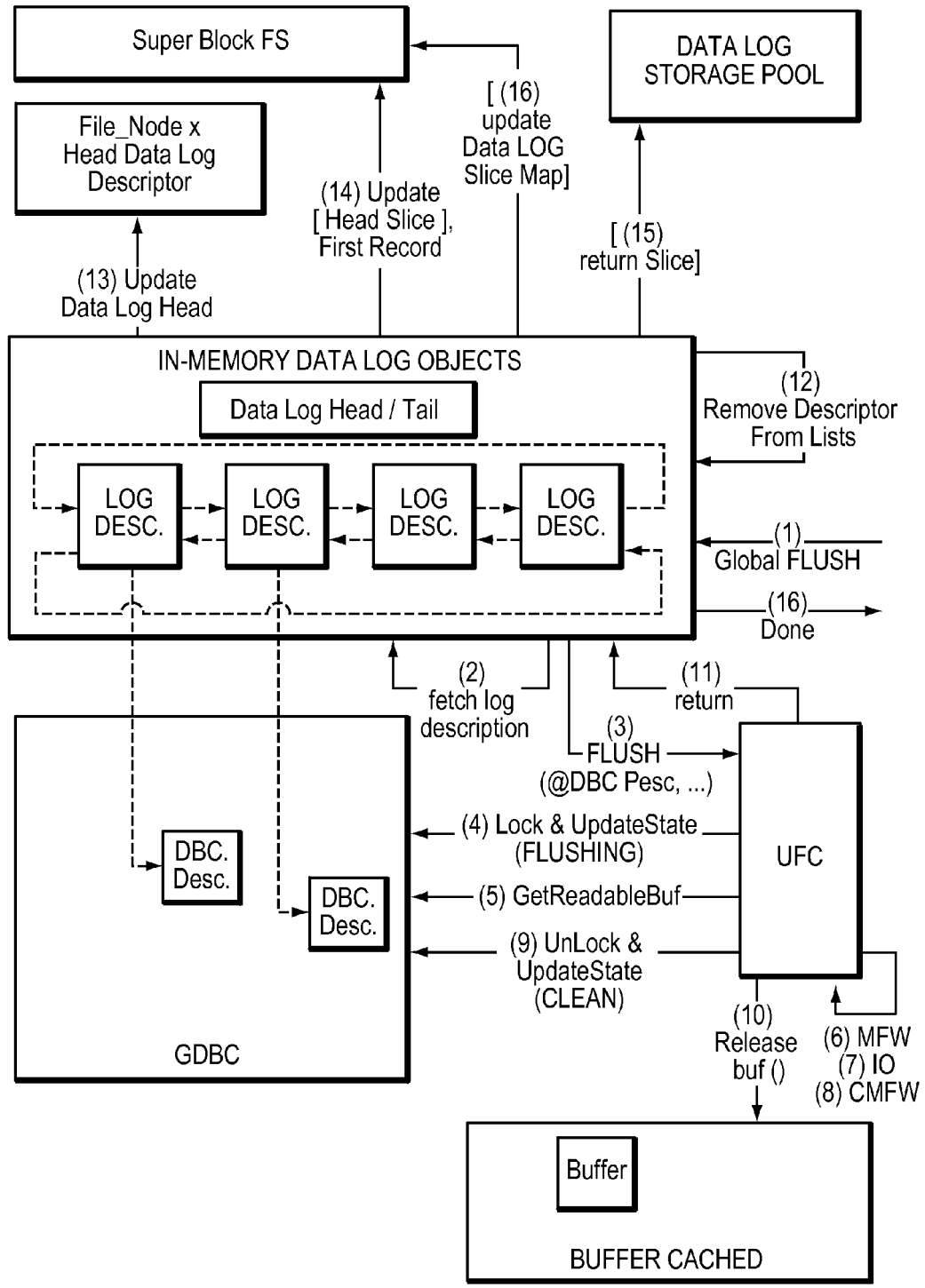

Referring to FIG. 17, shown is a detailed representation of components that may be included in an embodiment using the techniques described herein. With reference also to FIGS. 5-11, a background process commits (also referred to herein as "flush") the data logged in a data transaction log of a file system and cached in the global data block cache 126 of a data storage system. The background process updates on-disk data of the file system stored on a storage device based on data cached in the global data block cache 126. Further, the data log descriptors stored in the data transaction log indicates data that is required to be flushed and the order in which the data is required to be flushed. Thus, a data transaction log queues data associated with write I/O requests in the same order the write I/O requests have been issued to a data storage system such that data associated with the write I/O requests can be flushed to a storage device in the same order the write I/O requests have been issued.

In at least one embodiment of the current technique, a data storage system may perform a global flush for each data transaction log in the data storage system based on a predetermined criteria such as a high water mark, a threshold value for the global data block cache 126, a threshold value for page manager 122. Further, in at least another embodiment of the current technique, a data storage system may flush data for a specific file system by committing data logged in a data transaction log associated with the file system to a storage device on which the file system is stored.

In order to flush a data transaction log, a background flush process processes each data log descriptor of the data transaction log. For each data log descriptor, the background process performs the following operations described below herein. First, a GDBC descriptor entry associated with a data log descriptor is retrieved. The file system I/O logic 124 acquires a lock on the GDBC descriptor entry and updates state of the GDBC descriptor entry to indicate that the GDBC descriptor entry is in a process of being flushed to a storage device. The file system I/O logic 124 retrieves a buffer cache block associated with the GDBC descriptor entry and performs a write I/O operation that writes contents of the buffer cache block to the file system stored on the storage device thereby updating on-disk data of the file system. The file system I/O logic 124 releases the lock on the GDBC descriptor entry and updates state of the GDBC descriptor entry to indicate that the GDBC descriptor entry has been flushed to the persistent storage. Further, the reference to the buffer cache block is released. The file system I/O logic 124 notifies the data transaction log. The data transaction log removes the data log descriptor entry. Each data log descriptor of the data transaction log is linked in a list with a data log head pointing to the first entry of the list and a data log tail pointing to the last entry of the list. Further, metadata of a file of the file system is updated to indicate a new data log head such that the new data log head points to the next data log descriptor entry in the list. Further, information in the file system super block 72 of the file system is updated to indicate a change in the head slice and the first record indicating the new data log head. Further, if a slice that stores the data log descriptor which has been flushed becomes empty, the slice may be returned to a data log storage pool associated with the file system. Further, if the slice is returned to the data storage pool, the data log slice map of the file system super block 72 of the file system is updated to indicate that the slice is free.

Figure 18:
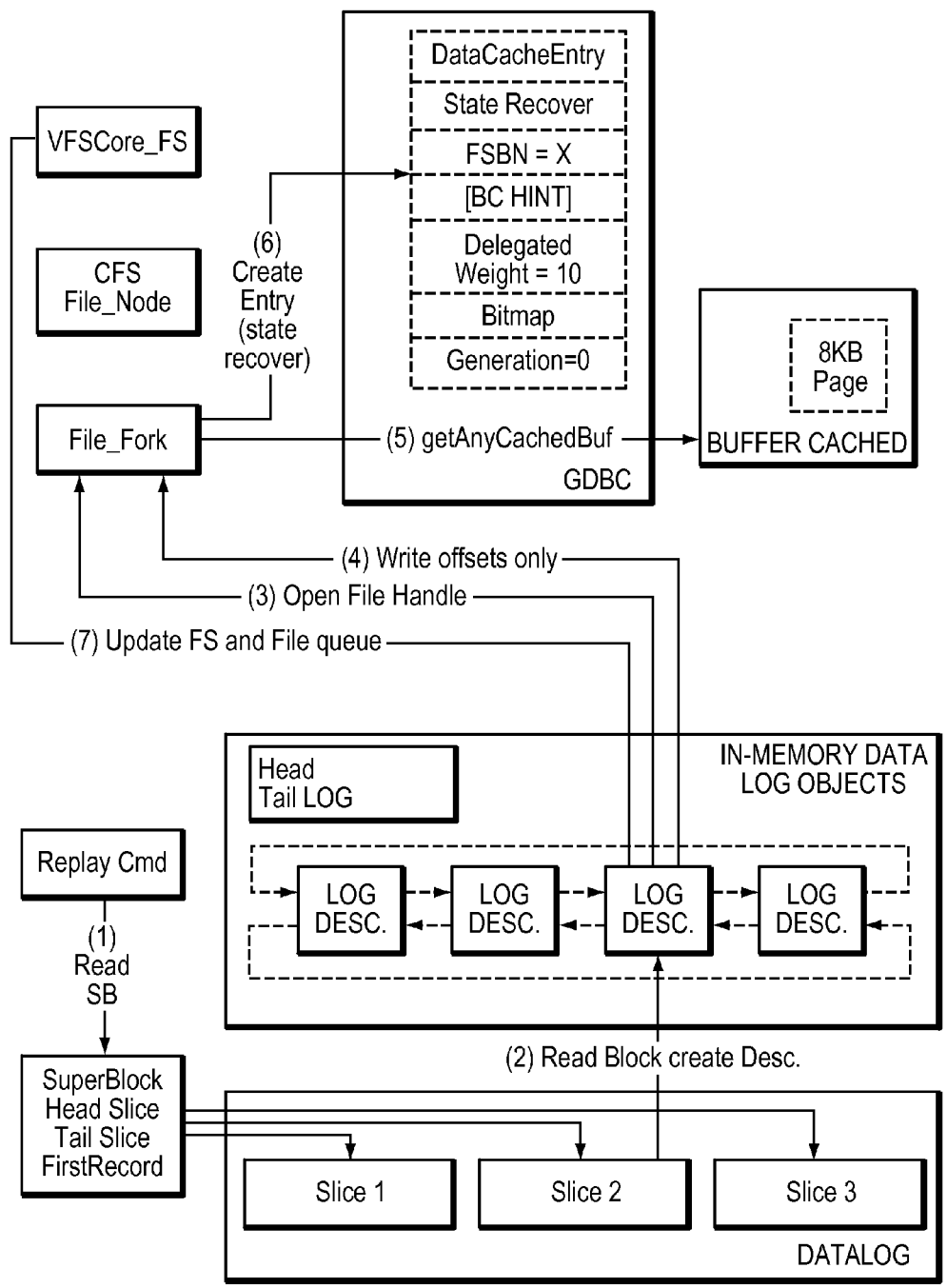

Referring to FIG. 18, shown is a detailed representation of components that may be included in an embodiment using the techniques described herein. With reference also to FIGS. 1-10, in at least one embodiment of the current technique, if a file system is remounted, state of data cached in the global data block cache 126 for such file system is recovered. However, a recovery process may not recover each data block cached in the global data block cache 126 for a file system when the file system is remounted. For example, if size of a volatile memory of a data storage system is 100 gigabytes (GB), a recovery process may not read 100 gigabytes of data back in the memory before allowing a client to access a file system upon remounting the file system. Thus, in at least one embodiment in accordance with the current technique, a data storage system performs a delayed recovery, which only recovers metadata of data that has been cached in the global data block cache 126 during the last mount of a file system. Thus, when such file system is unmounted and remounted, only metadata is recovered and data associated with the metadata is retrieved from a storage device by a background process. In case, a client issues a read I/O request for data prior to the time the background recovery process retrieves the data from the storage device and into the global data block cache 126, the data storage system performs an "in bound" recovery to read the data from the storage device as part of the read I/O operation and caches the data in the global data block cache 126.

Referring back to FIG. 18, in at least one embodiment of the current technique, a recovery process recovers data for a file system by first evaluating contents of file system super block 72 for the file system. The recovery process determines the head slice and the first record in the data transaction log associated with the file system. The recovery process evaluates each data log record in the data transaction log and performs the following operations for each data log header. The recovery process creates a data log descriptor in a volatile memory of the data storage system. The recovery process then creates a GDBC descriptor entry in the global data block cache 126 and associates the GDBC descriptor entry with the data log descriptor. A buffer cache block is allocated from page manager 122 and associated with the GDBC descriptor entry. The state of the GDBC descriptor entry is updated to indicate that the buffer cache block associated with the GDBC descriptor entry does not include data and is in a process of being recovered. Further, data for the buffer cache block may be retrieved from the data transaction log by a background process. Thus, the recovery process creates a set of buffer cache descriptor entries in the global data block cache 126 that are associated with respective buffer cache blocks such that the respective buffer cache blocks may not include any data at that time and data for the respective buffer cache blocks may be recovered by a background process.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing global data caches for file systems, the method comprising:

allocating space in a volatile memory of a data storage system to a global data cache, configured to store a set of data objects for a plurality of different file systems, wherein a data object of the set of data objects is accessed and shared by the plurality of different file systems, wherein the set of data objects cached in the global data cache is managed by a set of global data block cache descriptors, wherein each data object of the set of data objects is referenced by a global data block cache descriptor of the set of global data block cache descriptors;

reserving space in address space of the file system for storing a persistent data transaction log associated with the file system, wherein storage for the persistent data transaction log is allocated from a non-volatile memory of the data storage system, wherein the persistent data transaction log manages a set of data log descriptors associated with the set of data objects cached in the global data cache;

storing changes to contents of a file of a file system in a data object of the set of data objects of the global data cache upon receiving a write I/O request for the file of the file system, wherein a copy of the data object and information for the data object are also stored in the persistent data transaction log associated with the file system; and updating contents of the file on a storage device based on the data object stored in the global data cache and information stored in the persistent data transaction log, wherein the contents of the file are updated on the storage device after providing acknowledgement of completion of the write I/O request.

2. The method of claim 1, wherein the global data cache includes a set of global data block cache descriptors for storing information for a set of buffer cache objects stored in the volatile memory of the data storage system, wherein a global data block cache descriptor of the set of global data block cache descriptors is associated with a buffer cache object of the set of buffer cache objects, wherein a buffer cache object stores a data block of the file of the file system.

3. The method of claim 1, wherein the persistent data transaction log is apportioned into a set of sections, wherein a section of the set of sections include a header area and a record area, wherein the header area includes a chunk header and a set of data log headers, wherein the record area includes a set of data log records, wherein a data log record of the set of data log records includes data and a data log header associated with the data.

4. The method of claim 3, further comprising:
selecting a slice from a storage tier of a storage pool based on a performance characteristic of the storage tier; and
allocating the slice to the persistent data transaction log for apportioned the slice into the set of sections.

5. The method of claim 1, further comprising:
updating the contents of the file on the storage device in background by a flush process, wherein the flush process evaluates a set of data log descriptors stored in the volatile memory of the data storage system and associated with the persistent data transaction log, wherein a data log descriptor of the set of data log descriptors indicates a data object of the global data cache storing a portion of the contents of the file, wherein the flush process updates the contents of the file on the storage device with contents of the data object of the global data cache.

6. The method of claim 1, further comprising:
associating a first file with a first file fork object, wherein a data block of the first file is stored in a buffer cache object, wherein the buffer cache object is associated with a global data block cache descriptor of the global data cache, wherein the global data block cache descriptor is accessed by the first file fork object; and
associating a second file with a second file fork object, wherein the second file fork object accesses the buffer cache object by referring to the global data block cache descriptor of the global data cache, wherein the data block is shared by the first and second files.

7. The method of claim 1, further comprising:
receiving a read I/O request for reading data of the file of the file system;
determining whether to allocate a buffer cache object based on whether the global data cache includes a global data block cache descriptor referring to a buffer cache object storing the data;
based on the determination, reading the data of the file from the storage device into the buffer cache object; and
providing the buffer cache object for completing the read I/O request.

8. The method of claim 1, further comprising:
receiving a write I/O request for writing data to the file of the file system;
determining whether to allocate a buffer cache object based on whether the global data cache includes a global data block cache descriptor referring to a buffer cache object storing a data block of the file associated with an offset at which to write the data of the file;
based on the determination, reading contents of the file from the storage device into the buffer cache object; and
writing data to the buffer cache object; and
providing acknowledgement of completion of the write I/O request.

9. The method of claim 1, further comprising:
recovering the file system upon receiving a request to remount the file system on the data storage system.

10. The method of claim 9, further comprising:
retrieving a set of data log headers from a header portion of a section of the persistent data transaction log;
creating a set of data log descriptors in the volatile memory of the data storage system, wherein a data log descriptor of the set of data log descriptors is associated with a data log header of the set of data log headers;
creating a set of global data block cache descriptors in the global data cache, wherein a data log descriptor of the set of data log descriptors is associated with a global data block cache descriptor of the set of global data block cache descriptors;
allocating a set of buffer cache objects in the volatile memory, wherein a global data block cache descriptor of the set of global data block cache descriptors is associated with a buffer cache object of the set of buffer cache objects;
determining whether to read data of the file from the storage device into a buffer cache object; and
based on the determination, recovering data in the buffer cache object in background.

11. A system for use in managing global data caches for file systems, the system comprising:
first logic allocating space in a volatile memory of a data storage system to a global data cache, configured to store a set of data objects for a plurality of different file systems, wherein a data object of the set of data objects is accessed and shared by the plurality of different file systems, wherein the set of data objects cached in the global data cache is managed by a set of global data block cache descriptors, wherein each data object of the set of data objects is referenced by a global data block cache descriptor of the set of global data block cache descriptors;

second logic reserving space in address space of the file system for storing a persistent data transaction log associated with the file system, wherein storage for the persistent data transaction log is allocated from a non-volatile memory of the data storage system, wherein the persistent data transaction log manages a set of data log descriptors associated with the set of data objects cached in the global data cache;

third logic storing changes to contents of a file of a file system in a data object of the set of data objects of the global data cache upon receiving a write I/O request for the file of the file system, wherein a copy of the data object and information for the data object are also stored in the persistent data transaction log associated with the file system; and fourth logic updating contents of the file on a storage device based on the data object stored in the global data cache and information stored in the persistent data transaction log, wherein the contents of the file are updated on the storage device after providing acknowledgement of completion of the write I/O request.

12. The system of claim 11, wherein the global data cache includes a set of global data block cache descriptors for storing information for a set of buffer cache objects stored in the volatile memory of the data storage system, wherein a global data block cache descriptor of the set of global data block cache descriptors is associated with a buffer cache object of the set of buffer cache objects, wherein a buffer cache object stores a data block of the file of the file system.

13. The system of claim 11, wherein the persistent data transaction log is apportioned into a set of sections, wherein a section of the set of sections include a header area and a record area, wherein the header area includes a chunk header and a set of data log headers, wherein the record area includes a set of data log records, wherein a data log record of the set of data log records includes data and a data log header associated with the data.

14. The system of claim 13, further comprising:
fifth logic selecting a slice from a storage tier of a storage pool based on a performance characteristic of the storage tier; and
sixth logic allocating the slice to the persistent data transaction log for apportioned the slice into the set of sections.

15. The system of claim 11, further comprising:
fifth logic updating the contents of the file on the storage device in background by a flush process, wherein the flush process evaluates a set of data log descriptors stored in the volatile memory of the data storage system and associated with the persistent data transaction log, wherein a data log descriptor of the set of data log descriptors indicates a data object of the global data cache storing a portion of the contents of the file, wherein the flush process updates the contents of the file on the storage device with contents of the data object of the global data cache.

16. The system of claim 11, further comprising:
fifth logic associating a first file with a first file fork object, wherein a data block of the first file is stored in a buffer cache object, wherein the buffer cache object is associated with a global data block cache descriptor of the global data cache, wherein the global data block cache descriptor is accessed by the first file fork object; and
sixth logic associating a second file with a second file fork object, wherein the second file fork object accesses the buffer cache object by referring to the global data block cache descriptor of the global data cache, wherein the data block is shared by the first and second files.

17. The system of claim 11, further comprising:
fifth logic receiving a read I/O request for reading data of the file of the file system;
sixth logic determining whether to allocate a buffer cache object based on whether the global data cache includes a global data block cache descriptor referring to a buffer cache object storing the data;
seventh logic reading, based on the determination, the data of the file from the storage device into the buffer cache object; and
eighth logic providing the buffer cache object for completing the read I/O request.

18. The system of claim 11, further comprising:
fifth logic receiving a write I/O request for writing data to the file of the file system;
sixth logic determining whether to allocate a buffer cache object based on whether the global data cache includes a global data block cache descriptor referring to a buffer cache object storing a data block of the file associated with an offset at which to write the data of the file;
seventh logic reading, based on the determination, contents of the file from the storage device into the buffer cache object; and
eighth logic writing data to the buffer cache object; and
ninth logic providing acknowledgement of completion of the write I/O request.

19. The system of claim 11, further comprising:
fifth logic recovering the file system upon receiving a request to remount the file system on the data storage system.

20. The system of claim 19, further comprising:
sixth logic retrieving a set of data log headers from a header portion of a section of the persistent journal data transaction log;
seventh logic creating a set of data log descriptors in the volatile memory of the data storage system, wherein a data log descriptor of the set of data log descriptors is associated with a data log header of the set of data log headers;
eighth logic creating a set of global data block cache descriptors in the global data cache, wherein a data log descriptor of the set of data log descriptors is associated with a global data block cache descriptor of the set of global data block cache descriptors;
ninth logic allocating a set of buffer cache objects in the volatile memory, wherein a global data block cache descriptor of the set of global data block cache descriptors is associated with a buffer cache object of the set of buffer cache objects;
tenth logic determining whether to read data of the file from the storage device into a buffer cache object; and
eleventh logic recovering, based on the determination, data in the buffer cache object in background.

* * * * *